(12) United States Patent
Foo

(10) Patent No.: US 12,184,520 B2
(45) Date of Patent: Dec. 31, 2024

(54) HIGH-SPEED PACKET FILTERING

(71) Applicant: FMAD Engineering (SNG) Pte. Ltd., Singapore (SG)

(72) Inventor: Aaron Foo, Bangkok (TH)

(73) Assignee: FMAD ENGINEERING (SNG) PTE. LTD., Singapore (SG)

( * ) Notice: Subject to any disclaimer, the term of this patent is extended or adjusted under 35 U.S.C. 154(b) by 0 days.

(21) Appl. No.: 18/167,419

(22) Filed: Feb. 10, 2023

(65) Prior Publication Data

US 2023/0269148 A1  Aug. 24, 2023

Related U.S. Application Data

(60) Provisional application No. 63/312,290, filed on Feb. 21, 2022.

(51) Int. Cl.
*H04L 43/04* (2022.01)
*G06F 16/22* (2019.01)

(52) U.S. Cl.
CPC .......... *H04L 43/04* (2013.01); *G06F 16/2255* (2019.01)

(58) Field of Classification Search
CPC . G06F 16/2365; G06F 16/2255; H04L 41/12; H04L 43/10; H04L 43/12; H04L 43/0876; H04L 43/16; H04L 67/10; H04L 43/08; H04L 43/04
See application file for complete search history.

(56) References Cited

U.S. PATENT DOCUMENTS

| | | | |
|---|---|---|---|
| 5,193,071 | A | 3/1993 | Umina |
| 5,317,734 | A | 5/1994 | Gupta |
| 5,671,237 | A | 9/1997 | Zook |
| 6,021,429 | A | 2/2000 | Danknick |
| 6,052,362 | A | 4/2000 | Somer |

(Continued)

FOREIGN PATENT DOCUMENTS

JP  2015023323 A  2/2015

OTHER PUBLICATIONS

Office Action, U.S. Appl. No. 17/406,385, mailed Dec. 20, 2023, [17-437-CIP-CON].

(Continued)

*Primary Examiner* — Ninos Donabed
(74) *Attorney, Agent, or Firm* — McDonnell, Boehnen, Hulbert & Berghoff LLP

(57) ABSTRACT

An example embodiment may involve obtaining a packet filter definition that specifies characteristics of packets; compiling the packet filter definition to instructions of low-level code; generating a hash template based on a subset of the instructions, wherein the hash template includes pairs of byte offsets and byte counts that define locations within the packets at which the characteristics are disposed; based on application of the hash template to a plurality of stored packets, creating hash table entries in a hash table, wherein the hash table entries are respectively associated with subsets of the stored packets, wherein the subsets of the stored packets have respectively unique patterns of values within their bytes at the locations defined by the pairs of byte offsets and byte counts; updating the hash table entries to refer to metadata relating to their respective subset of the stored packets; and storing the hash table and the metadata.

20 Claims, 19 Drawing Sheets

(56) References Cited

U.S. PATENT DOCUMENTS

| | | | |
|---|---|---|---|
| 6,069,898 A | 5/2000 | Nakatsugawa | |
| 6,112,294 A | 8/2000 | Merchant | |
| 6,134,630 A | 10/2000 | McDonald | |
| 6,170,063 B1 | 1/2001 | Golding | |
| 6,173,333 B1 | 1/2001 | Jolitz | |
| 6,175,571 B1 | 1/2001 | Haddock | |
| 6,182,176 B1 | 1/2001 | Ziegler | |
| 6,272,131 B1 | 8/2001 | Ofek | |
| 6,414,966 B1 | 7/2002 | Kulkarni | |
| 6,473,809 B1 | 10/2002 | Aref | |
| 6,571,318 B1 | 5/2003 | Sander | |
| 6,757,742 B1* | 6/2004 | Viswanath | H04L 61/10 709/213 |
| 7,009,967 B1 | 3/2006 | Hariharasubrahmanian | |
| 7,054,911 B1 | 5/2006 | Lango | |
| 7,065,102 B1* | 6/2006 | Petersen | H04L 43/50 711/216 |
| 7,120,828 B2 | 10/2006 | Greer | |
| 7,540,029 B1 | 5/2009 | Saxena | |
| 7,631,193 B1 | 12/2009 | Hoffman | |
| 7,688,727 B1* | 3/2010 | Ferguson | H04L 67/1001 370/230.1 |
| 7,855,974 B2 | 12/2010 | Merkey | |
| 8,433,777 B1 | 4/2013 | Liu | |
| 8,547,974 B1 | 10/2013 | Guruswamy | |
| 8,830,840 B1 | 9/2014 | Couturier | |
| 8,880,696 B1 | 11/2014 | Michels | |
| 9,426,011 B2 | 8/2016 | Zhang | |
| 9,426,071 B1 | 8/2016 | Caldejon | |
| 9,578,046 B2 | 2/2017 | Baker | |
| 9,591,015 B1 | 3/2017 | Amin | |
| 9,621,572 B2 | 4/2017 | Drissel | |
| 9,674,298 B1 | 6/2017 | Edwards | |
| 9,756,154 B1 | 9/2017 | Jiang | |
| 10,013,200 B1 | 7/2018 | Shveidel | |
| 10,193,929 B2 | 1/2019 | Shieh | |
| 10,230,643 B2 | 3/2019 | Ferrell | |
| 10,423,358 B1 | 9/2019 | Foo | |
| 10,574,669 B1 | 2/2020 | Castro | |
| 10,721,244 B2 | 7/2020 | Chiba | |
| 10,831,408 B2 | 11/2020 | Foo | |
| 10,990,326 B2 | 4/2021 | Foo | |
| 11,036,438 B2 | 6/2021 | Foo | |
| 11,128,740 B2 | 9/2021 | Foo | |
| 11,249,688 B2 | 2/2022 | Foo | |
| 11,392,317 B2 | 7/2022 | Foo | |
| 2001/0030943 A1 | 10/2001 | Gregg | |
| 2001/0038607 A1 | 11/2001 | Honda | |
| 2002/0188742 A1 | 12/2002 | Nie | |
| 2003/0037337 A1 | 2/2003 | Yona | |
| 2003/0058872 A1 | 3/2003 | Berggreen | |
| 2003/0099250 A1 | 5/2003 | Blanc | |
| 2003/0120879 A1 | 6/2003 | Chen | |
| 2004/0156313 A1 | 8/2004 | Hofmeister | |
| 2004/0193876 A1 | 9/2004 | Donley | |
| 2004/0233846 A1 | 11/2004 | Khandani | |
| 2004/0236982 A1 | 11/2004 | Greer | |
| 2005/0013300 A1 | 1/2005 | Akahane | |
| 2005/0220014 A1 | 10/2005 | Delregno | |
| 2005/0240745 A1 | 10/2005 | Iyer | |
| 2006/0277347 A1 | 12/2006 | Ashmore | |
| 2007/0061492 A1 | 3/2007 | van Riel | |
| 2007/0116292 A1 | 5/2007 | Kurita | |
| 2007/0248110 A1 | 10/2007 | Oz | |
| 2008/0126449 A1 | 5/2008 | Haitsma | |
| 2008/0148011 A1 | 6/2008 | Gopal | |
| 2008/0158958 A1 | 7/2008 | Sokolov | |
| 2008/0170561 A1* | 7/2008 | Halbraich | H04L 63/00 370/352 |
| 2009/0077561 A1 | 3/2009 | Feng | |
| 2009/0144819 A1* | 6/2009 | Babbar | H04L 47/10 726/13 |
| 2009/0262745 A1* | 10/2009 | Leong | H04L 49/355 370/396 |
| 2009/0316698 A1* | 12/2009 | Menten | H04L 49/90 370/392 |
| 2010/0054128 A1 | 3/2010 | O'Hern | |
| 2010/0161787 A1* | 6/2010 | Jones | G06F 11/3476 709/224 |
| 2010/0250709 A1 | 9/2010 | Mallett | |
| 2010/0332671 A1 | 12/2010 | Alfonso | |
| 2011/0026406 A1 | 2/2011 | Gamagenimal | |
| 2011/0145491 A1 | 6/2011 | Hartwich | |
| 2011/0205828 A1 | 8/2011 | Richter | |
| 2011/0225302 A1 | 9/2011 | Park | |
| 2012/0137055 A1 | 5/2012 | Lee | |
| 2012/0151307 A1 | 6/2012 | Abel | |
| 2012/0182891 A1 | 7/2012 | Lee | |
| 2013/0067137 A1 | 3/2013 | Molloy | |
| 2013/0094515 A1* | 4/2013 | Gura | H04L 63/0227 370/419 |
| 2013/0097220 A1 | 4/2013 | Lyons | |
| 2013/0119243 A1 | 5/2013 | Yuan | |
| 2013/0145105 A1 | 6/2013 | Sawicki | |
| 2013/0151584 A1 | 6/2013 | Westphal | |
| 2013/0227236 A1 | 8/2013 | Flynn | |
| 2013/0265883 A1 | 10/2013 | Henry | |
| 2013/0329744 A1 | 12/2013 | Hachiya | |
| 2013/0343378 A1* | 12/2013 | Veteikis | H04L 63/20 370/389 |
| 2013/0343379 A1* | 12/2013 | Stroud | H04L 43/06 370/389 |
| 2013/0343380 A1* | 12/2013 | Canion | H04L 49/65 370/389 |
| 2014/0010083 A1 | 1/2014 | Hamdi | |
| 2014/0071866 A1 | 3/2014 | Maciocco | |
| 2014/0277850 A1 | 9/2014 | Jobs | |
| 2014/0280778 A1* | 9/2014 | Paxton | H04L 61/2514 709/219 |
| 2015/0100856 A1 | 4/2015 | Zhang | |
| 2015/0227757 A1 | 8/2015 | Bestler | |
| 2015/0312384 A1 | 10/2015 | Sankaran | |
| 2015/0341473 A1 | 11/2015 | Dumitrescu | |
| 2016/0119811 A1 | 4/2016 | Merlin | |
| 2016/0127276 A1 | 5/2016 | Wu | |
| 2016/0149820 A1* | 5/2016 | McGhee | H04L 47/32 370/230 |
| 2016/0156516 A1* | 6/2016 | Nishi | H04L 43/16 370/329 |
| 2016/0246710 A1 | 8/2016 | Shimizu | |
| 2016/0259693 A1 | 9/2016 | Sundararaman | |
| 2016/0323172 A1* | 11/2016 | Friend | H04L 45/7453 |
| 2017/0063992 A1 | 3/2017 | Baek | |
| 2017/0199707 A1 | 7/2017 | Varghese | |
| 2017/0344439 A1 | 11/2017 | Howe | |
| 2018/0095675 A1 | 4/2018 | Kachare | |
| 2022/0058203 A1 | 2/2022 | Sitsky | |
| 2022/0210065 A1 | 6/2022 | Khanna | |
| 2022/0329505 A1 | 10/2022 | Malhotra | |

OTHER PUBLICATIONS

Arkime FAQ, https://arkime.com/faq, last accessed Jan. 26, 2023.

Ben Brahim et al., Using Energy-Efficient Overlays to Reduce Packet Error Rates in Wireless Ad-Hoc Networks, IEEE, Conference Paper, vol. 8, pp. 3717-3722. (Year: 2006).

Bregni et al., Slot Synchronization of a WDM Packet-Switched Slotted Ring, IEEE, vol. 25, Issue 10, Journal Article, pp. 2922-2930. (Year: 2007).

Francesco Fusco, et al., pcapIndex: An Index for Network Packet Traces with Legacy Compatibility, ACM SIGCOMM Computer Communication Review, vol. 42, Iss. 1, Jan. 2012 pp. 47-53, https://doi.org/10.1145/2096149.2096156.

GitHub—fmadio_pcap_bpfcounter_PCAP Packet counter with multiple BPF filters, https://github.com/fmadio/pcap_bpfcounter, Apr. 22, 2020, 2 pages.

"GitHub—fmadio_pcap2json_High Speed PCAP TO JSON conversion utility.pdf," https://github.com/fmadio/pcap2json, Apr. 22, 2020, 5 pages.

Kesavan et al., "Optimal Multicast with Packetization and Network Interface Support", 1997, IEEE, pp. 370-377.

(56) References Cited

OTHER PUBLICATIONS

Kim et al., High available system control network in the packet transport system, IEEE, Conference Paper, pp. 1-3 (Year: 2010).
Libpcap File Format, The Wireshark Wiki, https://wiki.wireshark.org/Developmenl/LibpcapFileFormat, 2015, 3 pages.
Manpage of TCPDUMP, http://tcpdump.org/manpages/tcpdump.1.html, 2017, 20 pages.
Nfdump netflow/sflow cookbook of examples, https://yurisk.info/2020/09/20/nfdump-netflow-usage-examples-cookbook/, Sep. 20, 2020.
NfSen—Netflow Sensor, https://nfsen.sourceforge.net/, last accessed Jan. 26, 2023.
Pcap-Filter(7) Man Page, https://www.tcpdump.org/manpages/pcap-filter.7.html, Nov. 19, 2022.
PlayStation 2 technical specifications, https://en.wikipedia.org/wiki/PlayStation_2_technical_specifications, Sep. 19, 2019.
Steven McCanne and and Van Jacobson, The BSD Packet Filter: A New Architecture for User-level Packet Capture, 1993 Winter USENIX conference, Jan. 25-29, 1993.
Office Action, U.S. Appl. No. 17/835,809, mailed Mar. 30, 2023.

* cited by examiner

| | |
|---|---|
| opcode:16 | jt:8 | jf:8 |
| k:32 | |

710

| opcodes | addr modes | | | | | |
|---|---|---|---|---|---|---|
| ldb | [k] | | | | | |
| ldh | [k] | | | | | |
| ld | #k | #len | M[k] | [k] | [x+k] | |
| ldx | #k | #len | M[k] | 4*([k]&0xf) | [x+k] | |
| st | | | M[k] | | | |
| stx | | | M[k] | | | |
| jmp | L | | | | | |
| jeq | #k, Lt, Lf | | | | | x |
| jgt | #k, Lt, Lf | | | | | x |
| jge | #k, Lt, Lf | | | | | x |
| jset | #k, Lt, Lf | | | | | x |
| add | #k | | | | | x |
| sub | #k | | | | | x |
| mul | #k | | | | | x |
| div | #k | | | | | x |
| and | #k | | | | | x |
| or | #k | | | | | x |
| lsh | #k | | | | | x |
| rsh | #k | | | | | x |
| ret | #k | | | | | a |
| tax | | | | | | |
| txa | | | | | | |

712

| | |
|---|---|
| #k | the literal value stored in $k$ |
| #len | the length of the packet |
| M[k] | the word at offset $k$ in the scratch memory store |
| [k] | the byte, halfword, or word at byte offset $k$ in the packet |
| [x+k] | the byte, halfword, or word at offset $x+k$ in the packet |
| L | an offset from the current instruction to L |
| #k, Lt, Lf | the offset to Lt if the predicate is true, otherwise the offset to Lf |
| x | the index register |
| 4*([k]&0xf) | four times the value of the low four bits of the byte at offset $k$ in the packet |

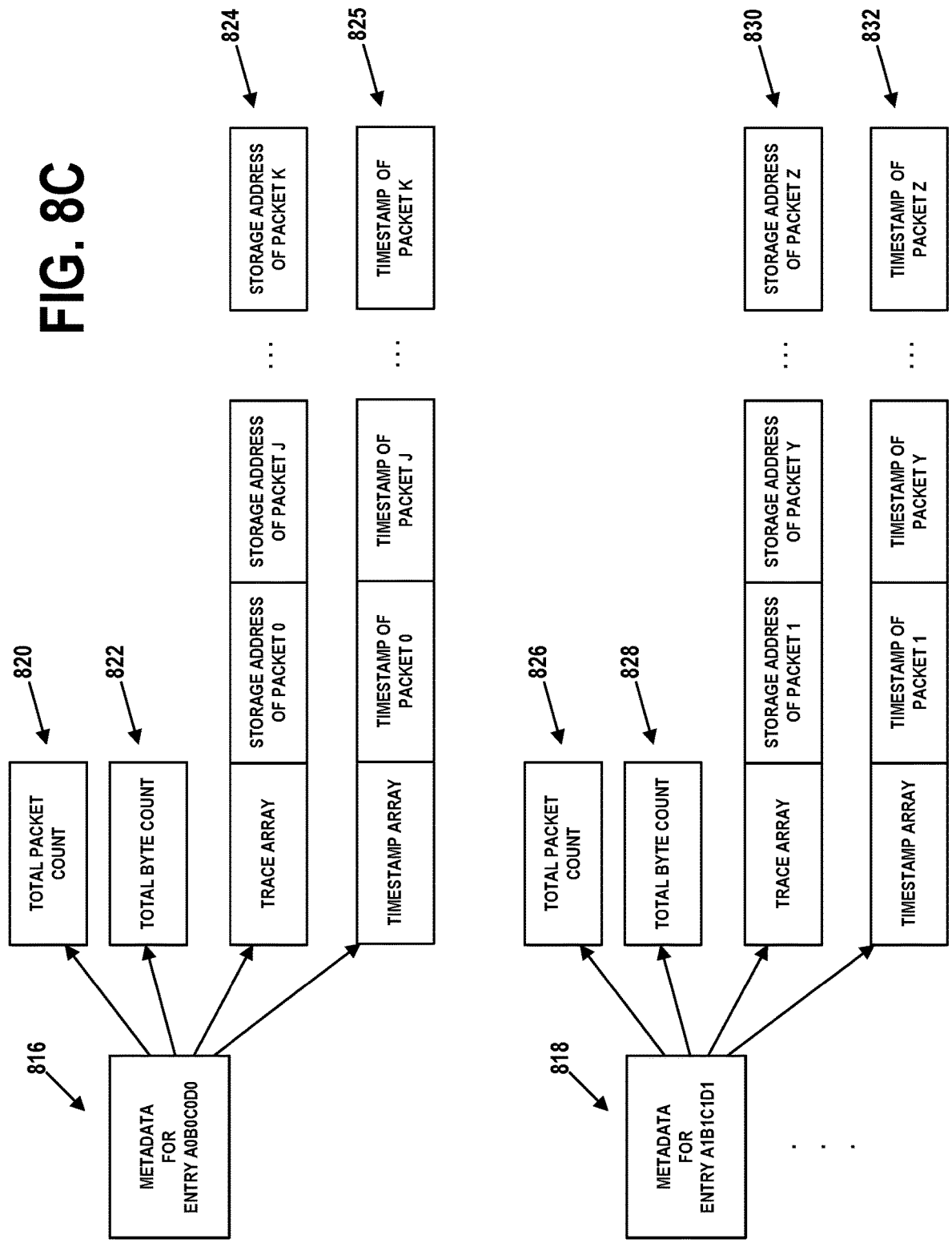

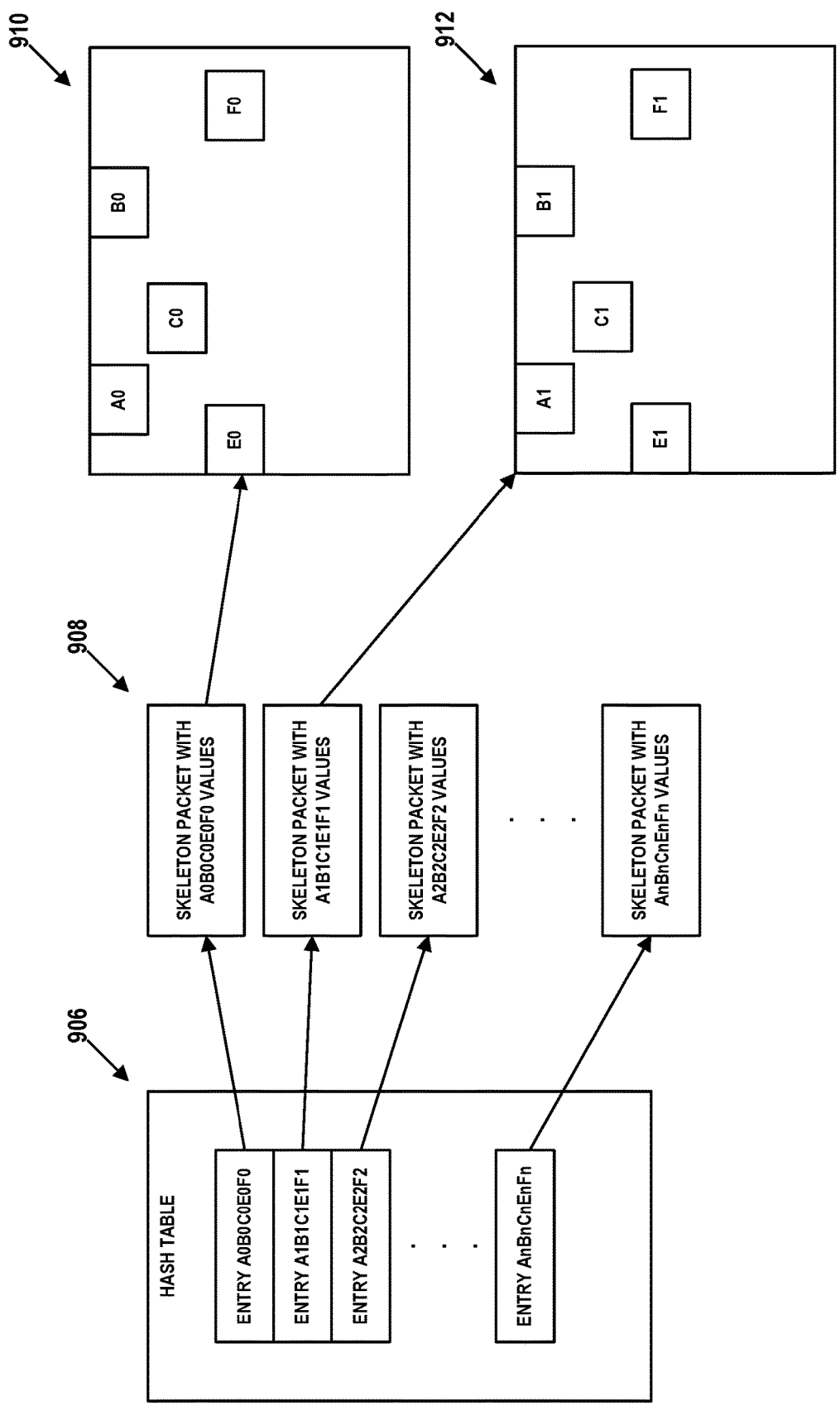

HIGH-SPEED PACKET FILTERING

CROSS-REFERENCE TO RELATED APPLICATION

This application claims priority to U.S. provisional patent application No. 63/312,290, filed Feb. 21, 2022, which is hereby incorporated by reference in its entirety.

BACKGROUND

As computer networks have grown faster and more ubiquitous over the last several decades, an increasing number of network services benefit from packet capture systems for purposes of logging and debugging. These systems attempt to capture some or all data packets transmitted to or from one or more computing devices or along a link of a network. Given that network speeds can be in the tens of gigabits per second (or even higher), a packet capture system may be required to support rates of several million packets per second. Such systems write these captured packets, or smaller representations thereof, to local or remote storage facilities (e.g., arrays of disk drives). But even relatively modest packet rates can result in many terabytes of storage being filled in less than a day. If there is a need to review a particular transaction involving a subset of these packets, filtering through the stored packets to identify and look up the desired subset can take hours.

SUMMARY

A first example embodiment may involve: obtaining a packet filter definition that specifies characteristics of packets; compiling the packet filter definition to instructions of low-level code; generating a hash template based on a subset of the instructions, wherein the hash template includes pairs of byte offsets and byte counts that define locations within the packets at which the characteristics are disposed; based on application of the hash template to a plurality of stored packets, creating hash table entries in a hash table, wherein the hash table entries are respectively associated with subsets of the stored packets, wherein the subsets of the stored packets have respectively unique patterns of values within their bytes at the locations defined by the pairs of byte offsets and byte counts; updating the hash table entries to refer to metadata relating to their respective subset of the stored packets; and storing the hash table in association with the metadata.

A second example embodiment may involve: receiving a new packet filter definition, wherein hash table entries in a hash table are respectively associated with subsets of captured packets, wherein the subsets of captured packets have respectively unique patterns of values within their bytes at locations defined by a stored packet filter representation, and wherein the hash table entries refer to metadata relating to their respective subsets of captured packets; determining that the new packet filter definition matches the locations defined by the stored packet filter representation; based on the stored packet filter representation, identifying the hash table; generating, for the hash table entries, skeleton packets having the respectively unique patterns of values within bytes at the locations defined by the stored packet filter representation; determining, from the skeleton packets, that the new packet filter definition matches the unique patterns of values of a particular subset of captured packets; and providing, from the hash table, particular metadata referred to by a particular hash table entry that is associated with the particular subset of the captured packets.

Herein the terms "byte offsets" and "byte counts" are to be interpreted broadly to also refer to bit-level offsets and counts, as well as other kinds of sub-byte offsets and counts (e.g., "nibbles" that are 4 bits). In some cases, "byte offsets" and "byte counts" could refer to word or half-word offsets and counts.

A third example embodiment may involve a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7B depicts tables defining the format and semantics of low-level code instructions, in accordance with example embodiments.

FIG. 8C depicts metadata associated with hash table entries, in accordance with example embodiments.

FIG. 9B depicts generating skeleton packets from hash table entries, in accordance with example embodiments.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. EXAMPLE COMPUTING DEVICES AND CLOUD-BASED COMPUTING ENVIRONMENTS

Figure 1:
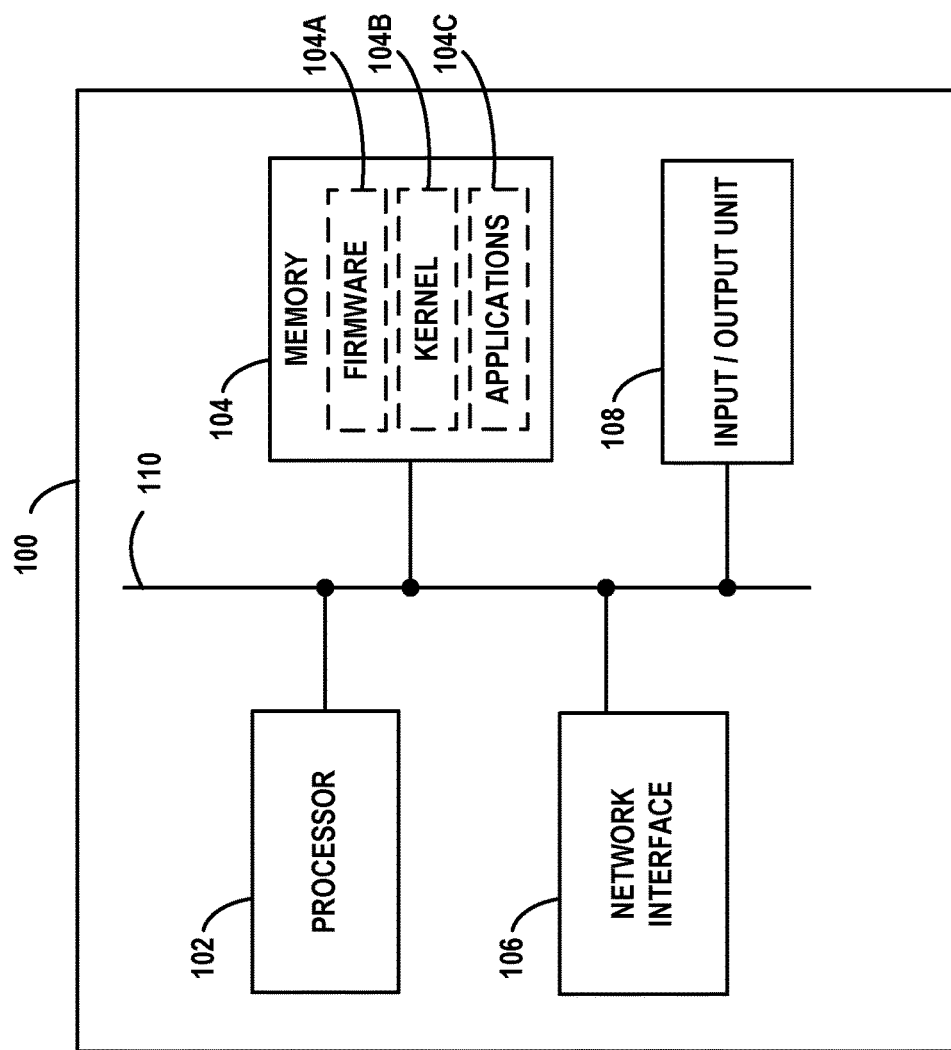
FIG. 1 depicts a schematic drawing of a computing device, in accordance with example embodiments.

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed. The exact physical location, connectivity, and configuration of these computing devices may be unknown and/or unimportant to client devices. Accordingly, the computing devices may be referred to as "cloud-based" devices that may be housed at various remote data center locations.

Figure 2:
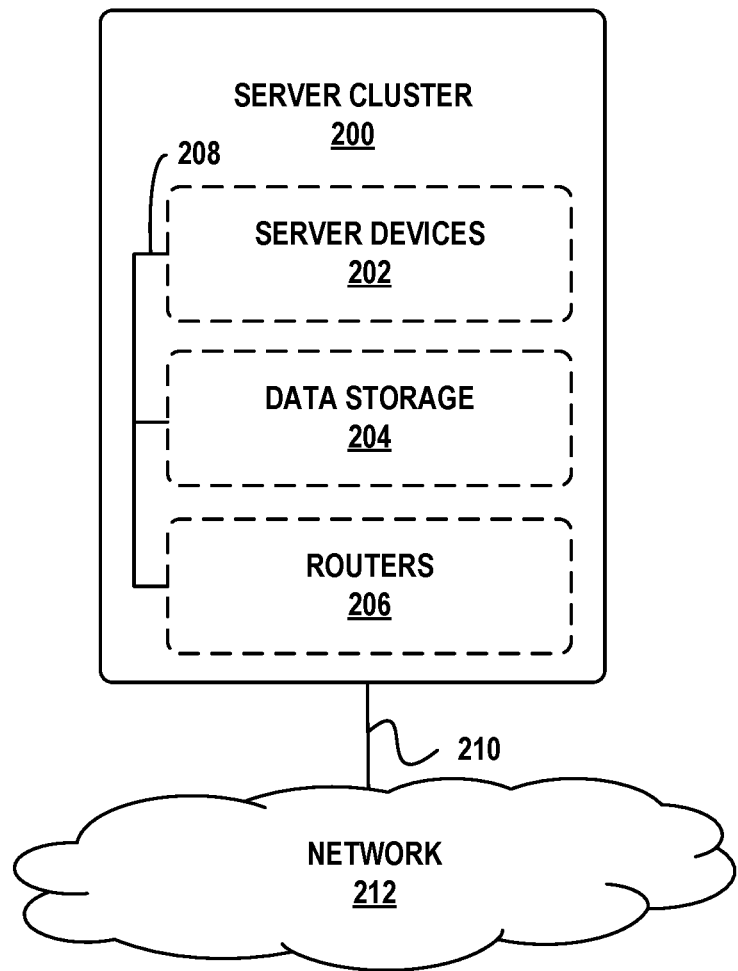
FIG. 2 depicts a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of the server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

II. EXAMPLE PACKET CAPTURE ARCHITECTURES

Figure 3:
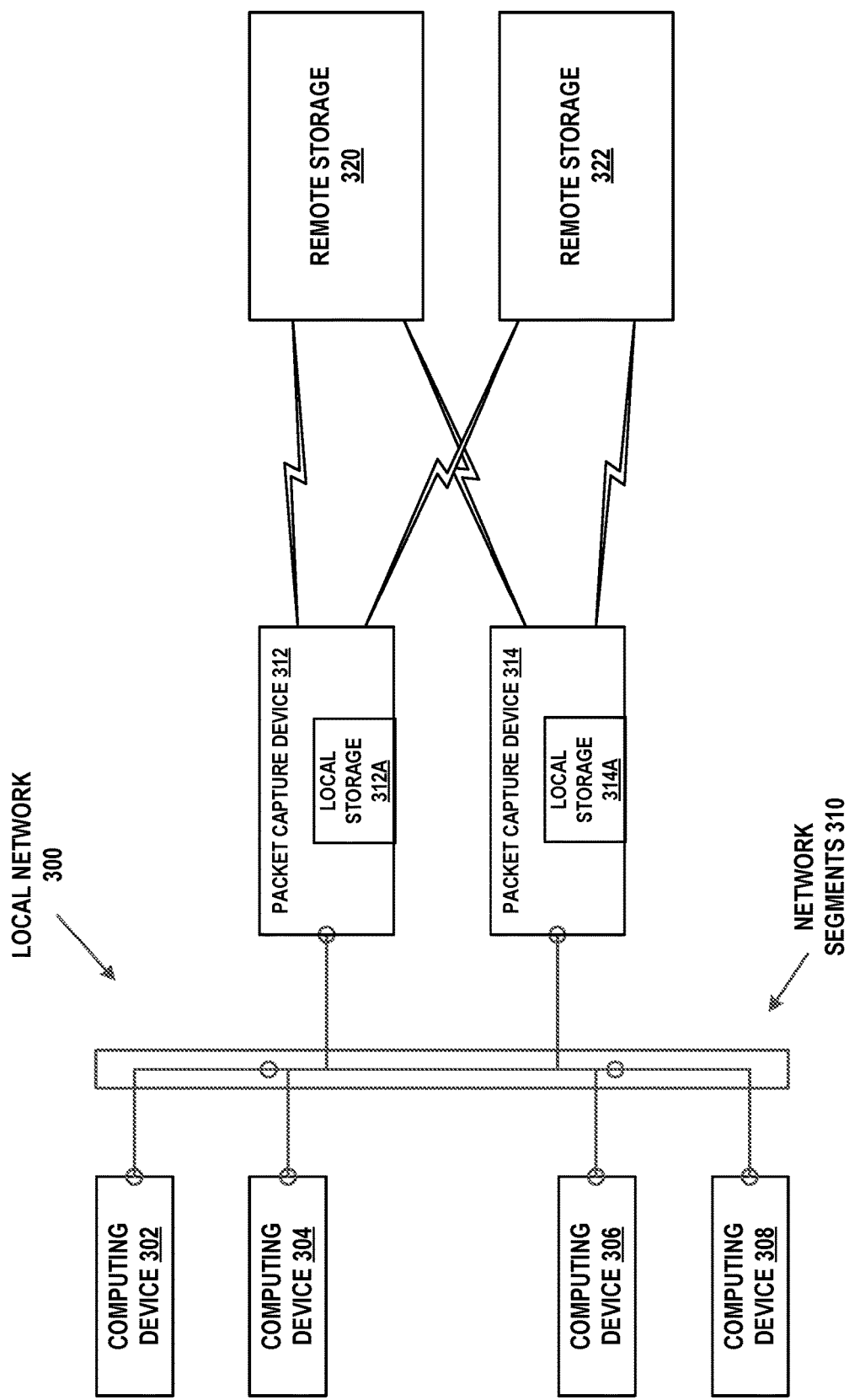
FIG. 3 depicts a packet capture architecture, in accordance with example embodiments.

FIG. 3 depicts an example packet capture architecture. Notably, this is just one possible packet capture architecture that is in accordance with various embodiments herein, and others may exist.

Local network 300 includes one or more network segments 310 on which computing devices 302, 304, 306, and 308, as well as packet capture devices 312 and 314 are disposed. As examples, local network 300 may comprise one or more 100 megabit per second, 1 gigabit per second, 10 gigabit per second, 25 gigabit per second, 40 gigabit per second, or 100 gigabit per second links.

Computing devices 302, 304, 306, and 308 may operate in accordance with one another to provide one or more services, such as a web-based service, a user management service, a communication service, a transaction management service, and so on. Thus, each of the computing devices may be compute nodes, database nodes, routers, or switches, or may take on some other role. Further each of computing devices 302, 304, 306, and 308 may be embodied by computing device 100 or variations thereof.

When engaging in transactions with one another or nodes elsewhere in a network, computing devices 302, 304, 306, and 308 may transmit and receive network packets (e.g., Ethernet frames containing IP or other types of packets) by way of local network 300. These packets may contain header and/or payload information that is of interest to various parties, the information being IP addresses, protocol types, port numbers, and so on. In some cases, total bytes counts and/or total packet counts of transactions involving one or more packets is of interest. In other cases, the payloads of these packets may be of interest.

Packet capture devices 312 and 314 may be computing devices configured to capture the packets that flow across network segments 310. In some cases, packet capture devices 312 and 314 may be configured to capture all of these packets, while in others they may capture only a subset of the packets as specified by one or more packet filter expressions. These expressions will be discussed in more detail below.

Packet capture devices 312 and 314 may also be embodied by computing device 100 or variations thereof. Thus, in some implementations, packet capture devices 312 and 314 could employ custom software executing on general-purpose computing hardware. In other embodiments, packet capture devices 312 and 314 may be based on the devices disclosed in U.S. Pat. Nos. 10,423,358, 10,831,408, 10,990, 326, 11,036,438, 11,128,740, 11,249,688, and/or 11,392, 317, each of which is incorporated by reference in its entirety herein. Notably, the FPGA-based hardware arrangements of such packet capture devices may be used in place of software or in conjunction with software to perform at least some of the features, aspects, steps, blocks, or embodiments herein.

Further, packet capture device 312 may include local storage 312A and packet capture device 314 may include local storage 314A. These local storages may take the form of one or more solid-state drives (SSDs) and/or hard disk drives (HDDs) that, among other things, can store captured packets. These packets may be stored in one or more files, database structures, or other arrangements. The amount of local storage per packet capture device may be several terabytes or more.

In some cases, captured packets may be stored temporarily in these local storages, e.g., managed in a first-in-first-out fashion when local storage capacity is at or near its maximum. Alternatively or additionally, captured packets may be stored in remote storage 320 and/or 322. These remote storage facilities may be located in large-scale server deployments or cloud-based platforms (e.g., Microsoft Azure, Amazon Web Services (AWS), or Google Cloud Platform (GCP)), and thus be able to maintain terabytes of stored packets for days, weeks, months, or longer. Here, the term "remote" indicates that remote storage 320 and 322 are not on local network 300, and may instead be reachable across a wide area network such as the Internet.

Packet storage techniques can vary between embodiments. Such techniques will be discussed in more detail below.

III. EXAMPLE PROTOCOL STACK

Figure 4:
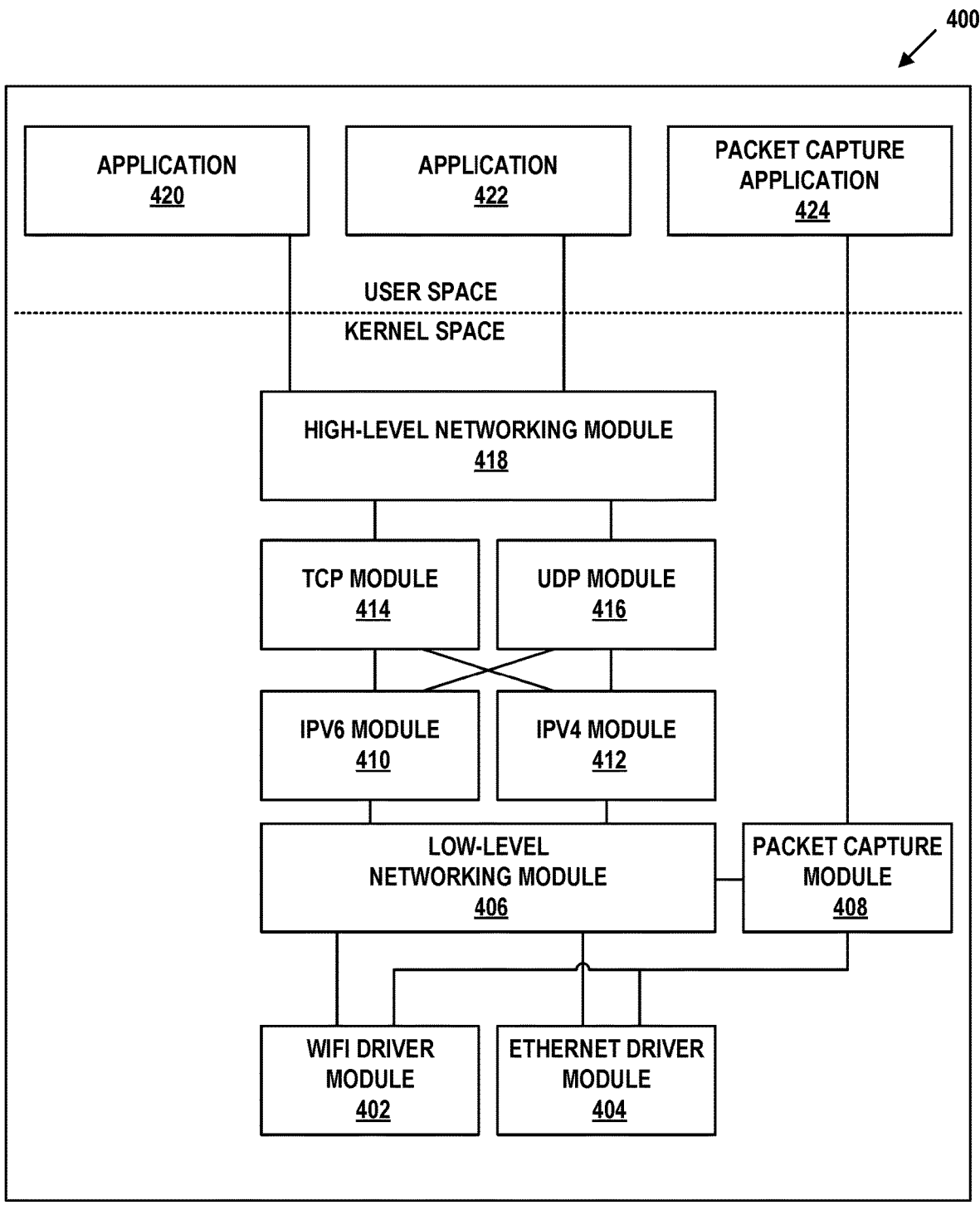
FIG. 4 depicts packet processing in a kernel space and a user space that support packet capture, in accordance with example embodiments.

FIG. 4 depicts a protocol stack, such as that of a computing device or packet capture device. Captured packets may traverse at least part of protocol stack 400.

Protocol stack 400 is divided into two general sections—kernel space and user space. Kernel-space modules carry out operating system functions while user-space modules are end-user applications or services that may be designed to execute on computing devices that support a specific type of kernel. Thus, user-space modules may rely on memory management, communication, and input/output services provided by the kernel. Kernel space in FIG. 4 may refer to part of kernel 104B in FIG. 1 (and a similar type of kernel in packet capture devices), while user space in FIG. 4 may refer to part of applications 104C in FIG. 1 (and similar types of applications in packet capture devices).

In full generality, protocol stack 400 may include more or fewer software modules. Particularly, the kernel space may contain additional kernel-space software modules to carry out operating system operations, and the user space may include additional user-space software modules to carry out application operations.

Wifi driver module 402 may be a kernel-space software module that operates and/or controls one or more physical Wifi hardware components. In some embodiments, Wifi driver module 402 provides a software interface to Wifi hardware, enabling a kernel to access Wifi hardware functions without needing to know precise control mechanisms of the Wifi hardware being used. When packets are transmitted or received by way of Wifi hardware, these packets may pass through Wifi driver module 402.

Similarly, Ethernet driver module 404 is a kernel-space software module that operates and/or controls one or more physical Ethernet hardware components. In some embodiments, Ethernet driver module 404 provides a software interface to Ethernet hardware, enabling a kernel to access Ethernet hardware functions without needing to know precise control mechanisms of the Ethernet hardware being used. When packets are transmitted or received by way of Ethernet hardware, these packets may pass through Ethernet driver module 404.

Protocol stack 400 may also include other driver modules not shown in FIG. 4. For instance, BLUETOOTH®, cellular, and/or GPS driver modules may be incorporated into protocol stack 400. Further, either or both of Wifi driver module 402 and Ethernet driver module 404 may be omitted.

Low-level networking module 406 routes inbound and outbound packets between driver software modules and network layer software modules (e.g., IPv6 module 410 and IPv4 module 412). Thus, low-level networking module 406 may serve as a software bus or switching mechanism, and may possibly provide application programming interfaces between driver software modules and network layer software modules. For instance, low-level networking module 406 may include one or more queues in which inbound packets are placed so that they can be routed to one of IPv6 module 410 and IPv4 module 412, and one or more queues in which outbound packets can be placed so that they can be routed to one of Wifi driver module 402 and Ethernet driver module 404. In some embodiments, low-level networking module 206 might not be present as a separate kernel-space software module, and its functionality may instead be incorporated into driver modules and/or network layer (e.g., IPv6 and/or IPv4) software modules.

IPv6 module 410 operates the Internet Protocol version 6 (IPv6). IPv6 is a version of the Internet Protocol that features an expanded address space, device auto-configuration, a simplified header, integrated security, and mobility support, and improved multicast capabilities. IPv6 module 410 encapsulates outbound packets received from higher-layer modules (including those of TCP module 414 and UDP module 416) in an IPv6 header. Conversely, IPv6 module 410 also decapsulates inbound IPv6 packets received from low-level networking module 406. Although it is not shown in FIG. 4, IPv6 module 410 may be associated with an ICMPv6 module that provides support for error and informational messages related to IPv6, as well as multicasting and address resolution.

IPv4 module 412 operates the Internet Protocol version 4 (IPv4). IPv4 is a version of the Internet Protocol that features a smaller address space than IPv6. Similar to IPv6 module 410, IPv4 module 412 encapsulates outbound packets received from high-layer modules (including those of TCP module 414 and UDP module 416) in an IPv4 header. Conversely, IPv4 module 412 also decapsulates inbound packets received from low-level networking module 406.

Although it is not shown in FIG. 4, IPv4 module 412 may be associated with an ICMPv4 module that provides support for simple error reporting, diagnostics, and limited configuration for devices, as well as messages that report when a destination is unreachable, a packet has been redirected from one router to another, or a packet was discarded due to experiencing too many forwarding hops.

As used herein, the terms "Internet Protocol" and "IP" may refer to either or both of IPv6 and IPv4. Context can be used to determine to which of these protocols is being referred, if and when such a distinction is of importance.

TCP module 414 operates the Transport Control Protocol (TCP). TCP is a reliable, end-to-end protocol that operates on the transport layer of a networking protocol stack. TCP is connection-oriented, in the sense that TCP connections are explicitly established and torn down. TCP includes mechanisms with which it can detect likely packet loss between a sender and recipient, and resend potentially lost packets. TCP is also a modified sliding window protocol, in that only a limited amount of data may be transmitted by the sender before the sender receives an acknowledgement for at least some of this data from the recipient. Also, the sender may operate a congestion control mechanism to avoid flooding an intermediate network with an excessive amount of data.

UDP module 416 operates the User Datagram Protocol (UDP). UDP is a connectionless, unreliable transport-layer protocol. Unlike TCP, UDP maintains little state regarding a UDP session, and does not guarantee delivery of application data contained in UDP segments.

High-level networking module 418 routes inbound and outbound packets between (i) user-space software modules and (ii) network-layer or transport-layer software modules (e.g., TCP module 414 and UDP module 416). Thus, high-level networking module 418 may serve as a software bus or switching mechanism, and may possibly provide application programming interfaces between user-space software modules and transport layer software modules. For instance, high-level networking module 418 may include one or more queues in which inbound packets are placed so that they can be routed to a user-space software module, and one or more queues in which outbound packets can be placed so that they can be routed to one of TCP module 414 and UDP module 416. In some embodiments, high-level networking module 418 may be implemented as a TCP/IP socket interface, which provides well-defined function calls that user-space software modules can use to transmit and receive data.

As noted above, user-space programs, such as application 420 and application 422, may operate in a user space. These applications may be, for example, web-based applications, email applications, social networking applications, messaging applications, gaming applications, transactional applications, or some other type of application. Through interfaces into the kernel space (e.g., high-level networking module 418 and/or other interfaces), these applications may be able to carry out input and output operations.

The modules of FIG. 4 described so far represent software (which could be replaced with firmware, hardware, or any combination of software, firmware, and hardware) used for incoming (received) and outgoing (transmitted) packet-based communication. Examples of incoming and outgoing packet processing follows.

When the Ethernet hardware receives a frame that has a destination Ethernet address matching that of its device, it may queue the frame in a hardware buffer and send an interrupt to Ethernet driver module 404. In response to the interrupt, Ethernet driver module 404 may read the frame out of the hardware buffer, validate the frame (e.g., perform a checksum operation), determine the higher-layer protocol to which the packet should be delivered (e.g., IPv6 module 410 or IPv4 module 412), strip off the Ethernet header and trailer bytes, and pass the resulting packet to low-level networking module 406 with an indication of the higher-layer protocol.

Low-level networking module 406 may place the packet in a queue for the determined higher-layer protocol. Assuming for the moment that this protocol is IPv4, low-level networking module 406 may place the packet in an IPv4 queue, from which it is read by IPv4 module 412.

IPv4 module 412 may read the packet from the queue, validate the packet (e.g., perform a checksum operation and verify that the packet has not been forwarded more than a pre-determined number of times), combine it with other packets if the packet is a fragment, determine the higher-layer protocol to which the packet should be delivered (e.g., TCP module 414 or UDP module 416), strip off the IPv4 header bytes, and pass the resulting segment to the determined higher-layer protocol. Assuming for the moment that this protocol is TCP, IPv4 module 412 may provide the segment to TCP module 414. In some cases, this may involve placing the segment in a queue, or IPv4 module 412 may provide TCP module 414 with a memory address at which the segment can be accessed.

TCP module 414 may read the segment from the queue, validate the segment, perform any necessary TCP congestion control and/or sliding window operations, determine the application "socket" to which the segment should be delivered, strip off the TCP header bytes, and pass the payload of the segment to the high-level networking module 418 along with an indication of the determined application. At this point, the "packet" or "segment" does not contain any headers, and in most cases is just a block of application data.

High-level networking module 418 may include queues associated with the socket communication application programming interface. Each "socket" may represent a communication session and may be associated with one or more applications. Incoming data queued for a socket may eventually be read by the appropriate application. Assuming for the moment that the application data is for application 420, high-level networking module 418 may hold the application data in a queue for a socket of application 420.

Application 420 may read the application data from the socket and then process this data. At this point, the incoming packet processing has ended.

Outgoing packet processing may begin when an application, such as application 420, writes application data to a socket. The socket may be, for instance, a TCP or UDP socket. Assuming that the application data is for a TCP socket, application 420 may provide the application data to high-level networking module 418, which in turn may queue the application data for TCP module 414.

TCP module 414 may read the application data from the queue, determine the content of a TCP header for the application data, and encapsulate the application data within the TCP header to form a segment. Values of fields in the TCP header may be determined by the status of the associated TCP session as well as content of the application data. TCP module 414 may then provide the segment to either IPv6 module 410 or IPv4 module 412. This determination may be made based on the type of socket from which the application data was read. Assuming for the moment that the socket type indicates IPv4, TCP module 414 may provide the segment to IPv4 module 412. In some cases, this may involve placing the segment in a queue, or TCP module 414 may provide IPv4 module 412 with a memory address at which the segment can be accessed.

IPv4 module 412 may determine the content of an IPv4 header for the segment, and encapsulate the segment within the IPv4 header, thus forming a packet. Values of fields in the IPv4 header may be determined by the socket from which the application data was read as well as content of the application data. IPv4 module 412 may then look up the destination of the packet (e.g., its destination IP address) in a forwarding table to determine the outbound hardware interface. Assuming for the moment that this interface is Ethernet hardware, IPv4 module 412 may provide the packet to low-level networking module 406 with an indication that the packet should be queued for Ethernet driver module 404.

Low-level networking module 406 may receive the packet and place it in a queue for Ethernet driver module 404. Alternatively, IPv4 module 412 may provide the packet directly to Ethernet driver module 404.

Regardless, Ethernet driver module may encapsulate the packet in an Ethernet header and trailer, and then provide the packet (in the form of a frame) to the Ethernet hardware. The Ethernet hardware may transmit the frame.

For sake of convenience, the terms "frame" and "packet" are used somewhat interchangeably herein despite their having related but different definitions. A frame is a unit of data at the data-link layer of the Open Systems Interconnection (OSI) model, while a packet is a unit of data at the network layer of the OSI model. A frame includes header information such as the source and destination MAC address, error checking and flow control information, and is used to encapsulate a packet. Thus, the term "frame" is used to refer to framed data (i.e., application data with at least some header or trailer bytes appended to it) at the data-link layer.

A packet includes header information such as the source and destination IP address, and routing information. Thus, the term "packet" is used to refer to framed data at the network layer. Nonetheless, capturing a "packet" as discussed herein often means that the entire frame encapsulating the packet is captured. Thus, the term packet refers to either a frame or the payload within the frame, depending on context.

Furthermore, the term "segment" is used to refer to encapsulated data at the transport (e.g., TCP or UDP) layer. Therefore, segments are transported inside of packets, which in turn are transported inside of frames. Typically, a frame is used for communication between devices on a local network, while a packet is used for communication between devices on different networks, and a segment is used for communication between applications executing on these devices.

IV. EXAMPLE PACKET CAPTURE

Given protocol stack 400 and the operations performed by each of its modules, it is desirable for a packet capture architecture to be able to intercept and capture copies of both incoming (received) and outgoing (transmitted) packets. Packet capture module 408 exists in kernel space to facilitate this functionality.

One or more of Wifi driver module 402, Ethernet driver module 404, and low-level networking module 406 may have an interface to packet capture module 408. This interface allows these modules to provide, to packet capture module 408, copies of packets transmitted and received by the device. For instance, Wifi driver module 402 and Ethernet driver module 404 may provide copies of all packets they receive to packet capture module 408, even if those packets are not ultimately addressed to the device. Technically, these packets are often frames as they respectively include Wifi and Ethernet headers. Furthermore, Wifi driver module 402 and Ethernet driver module 404 may provide copies of all packets they transmit. This allows packets generated by the device to be captured as well.

Regarding the capture of received packets, network interface hardware components, such Wifi and/or Ethernet hardware, normally will discard any incoming packets without a destination Wifi or Ethernet address that matches an address used by the device. Thus, Wifi driver module 402 and Ethernet driver module 404 might only receive incoming packets with a Wifi or Ethernet destination address that matches an address used by the device, as well as any incoming packets with a multicast or broadcast Wifi or Ethernet destination address. However, the Wifi and/or Ethernet hardware may be placed in "promiscuous mode" so that these components do not discard any incoming packets. Instead, incoming packets that normally would be discarded by the hardware are provided to Wifi driver module 402 and Ethernet driver module 404. These modules provide copies of the packets to packet capture module 408.

In some embodiments, Wifi driver module 402 and Ethernet driver module 404 may provide incoming packets to low-level networking module 406, and low-level networking module 406 may provide copies of these packets to packet capture module 408. In the outgoing direction, low-level networking module 406 may also provide copies of packets to packet capture module 408. In order to provide Wifi and Ethernet header and trailer information in these outgoing packets, low-level networking module 406 may perform Wifi and Ethernet encapsulation of the packets prior to providing them to packet capture module 408. Low-level networking module 406 may also provide copies of these encapsulated packets to Wifi driver module 402 and/or Ethernet driver module 404 which in turn may refrain from adding any further encapsulation, and may instead provide the packets as received to their respective hardware interfaces.

Packet capture module 408 may operate in accordance with packet capture application 424 to capture packets. Particularly, packet capture application 424 may provide a user interface through which one or more packet filter expressions may be entered. The user interface may include a graphical user interface, a command line, or a file.

The packet filter expressions may specify the packets that are to be delivered to packet capture application 424. For example, the packet filter expression "host 10.0.0.2 and tcp" may capture all TCP packets to and from the device with the IP address 10.0.0.2. As additional examples, the packet filter expression "port 67 or port 68" may capture all Dynamic Host Configuration Protocol (DHCP) packets, while the packet filter expression "not broadcast and not multicast" may capture only unicast traffic.

Packet filter expressions may include, as shown above, logical conjunctions such as "and", "or", and "not". With these conjunctions, complex packet filters can be defined. Nonetheless, the packet filter expressions shown above are for purpose of example, and different packet filtering syntaxes may be used. For instance, some filters may include a bitstring and an offset, and may match any packet that includes the bitstring at the offset number of bytes into the packet. The embodiments herein may operate with any form of BPF syntax (see below), for example, though other syntaxes are supported.

After obtaining a packet filter expression, packet capture application 424 may provide a representation of this expression to packet capture module 408. Packet capture application 424 and packet capture module 408 may communicate, for example, using raw sockets. Raw sockets are a special type of socket that allows communication of packets and commands between an application and a kernel module without protocol (e.g., IPv4, IPv6, TCP, or UDP) processing. Other types of sockets and APIs, however, may be used for packet capture instead of raw sockets.

In some embodiments, packet capture module 408 may compile the representation of the packet filter expression into low-level code, bytecode, or another format. Packet capture module 408 may then execute this code on a virtual machine for each packet it receives to determine whether the packet matches the specified filter. If the packet does not match the filter, the packet may be discarded. If the packet does match the filter, packet capture module 408 may provide the packet the packet capture application 424. Thus, packet capture application 424 may provide the packet filter expression to packet capture module 408 at the beginning of a packet capture session, and may receive a stream of packets matching this filter.

V. PACKET CAPTURE FORMATS

Figure 5:
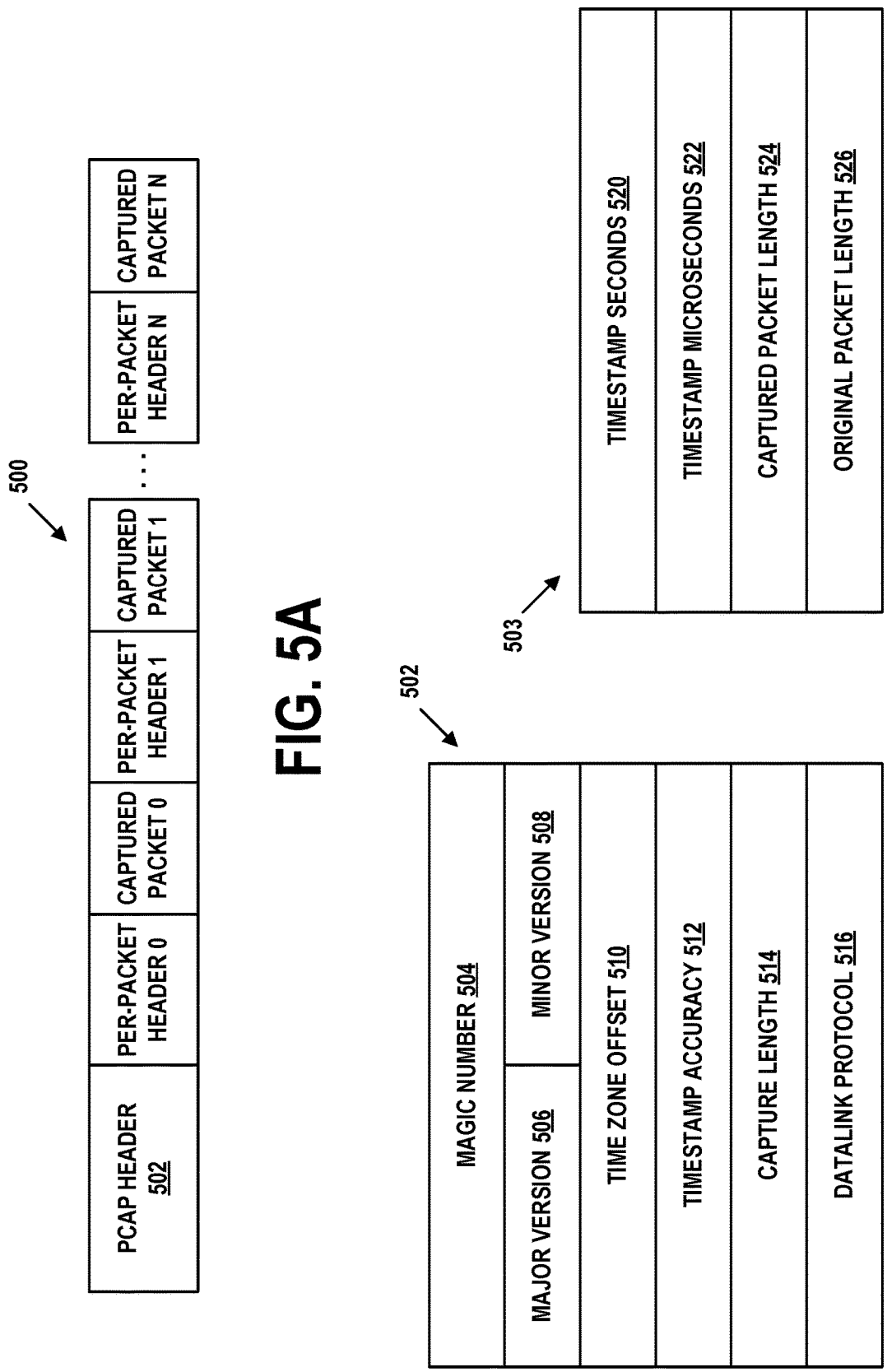
FIG. 5A depicts an arrangement of data in a packet capture file, in accordance with example embodiments.
FIG. 5B depicts a packet capture file header, in accordance with example embodiments.
FIG. 5C depicts a per-packet header in a packet capture file, in accordance with example embodiments.

Packet capture application may store the received packets in one of several possible formats. One such format is the PCAP (packet capture) format, illustrated in FIG. 5A. File 500 represents a series of N+1 captured packets in the PCAP format, stored in order of the time they were captured. PCAP header 502 is a data structure defined in FIG. 5B. Each of the N+1 captured packets may include a per-packet header, as well as protocol headers and payload bytes. An example per-packet header 503 is shown in FIG. 5C.

File 500 may be a binary file that can be stored within short-term storage (e.g., main memory) or long-term storage (e.g., an SSD or HDD). In some cases, representations of the captured packets are displayed or stored in real time as packet capture occurs. Thus, later-captured packets may be added to file 500 while earlier-captured packets are read from file 500 for display. In other embodiments, file 500 may be written to long-term storage for later processing.

As noted above, FIG. 5B illustrates the contents of PCAP header 502. There may be one instance of PCAP header 502 disposed at the beginning file 500.

Magic number 504 may be a pre-defined marker of the beginning of a file with PCAP header 502, and serves to indicate the byte-ordering of the computing device that performed the capture. For instance, magic number 504 may be defined to always have the hexadecimal value of 0xa1b2c3d4 in the native byte ordering of the capturing device. If the device that reads file 500 finds magic number 504 to have this value, then the byte-ordering of this device and the capturing device is the same. If the device that reads file 500 finds magic number 504 to have a value of 0xd4c3b2a1, then this device may have to swap the byte-ordering of the fields that follow magic number 504.

Major version 506 and minor version 508 may define the version of the PCAP format used in file 500. In most instances, major version 506 is 2 and minor version 508 is 4, which indicates that the version number is 2.4.

Time zone offset 510 may specify the difference, in seconds, between the local time zone of the capturing device and Coordinated Universal Time (UTC). In some cases, the capturing device will set this field to 0 regardless of its local time zone.

Timestamp accuracy 512 may specify the accuracy of any time stamps in file 500. In practice, this field is often set to 0.

Capture length 514 may specify the maximum packet size, in bytes, that can be captured. In some embodiments, this value is set to 65536, but can be set to be smaller if the user is not interested in large-payload packets, for instance. If a packet larger than what is specified in this field is captured, it may be truncated to conform to the maximum packet size.

Datalink protocol 516 may specify the type of datalink interface on which the capture took place. For instance, this field may have a value of 1 for Ethernet, 105 for Wifi, and so on.

FIG. 5C illustrates the contents of per-packet header 503. As shown in FIG. 5A, there may be one instance of per-packet header 503 for each packet represented in file 500. Each instance of per-packet header 503 may precede its associated packet.

Timestamp seconds 520 and timestamp microseconds 522 may represent the time at which the associated packet was captured. As noted above, this may be the local time of the capturing device or UTC time.

Captured packet length 524 may specify the number of bytes of the packet that were actually captured and saved in file 500. Original packet length 526 may specify the number of bytes in the packet as the packet appeared on the network on which it was captured.

In general, captured packet length 524 is expected to be less than or equal to original packet length 526. For example, if capture length 514 is 1000 bytes and a packet is 500 bytes, then captured packet length 524 and original packet length 526 may both be 500. However, if the packet is 1500 bytes, then captured packet length 524 may be 1000 while original packet length 526 may be 1500.

VI. CAPTURED PACKET INDEXING AND LOOKUP

The embodiments herein involve the indexing and looking up of captured packets. Using filtering on generated indexes, these embodiments facilitate extremely fast processing of terabytes of captured packets, completing in orders of magnitude less time than conventional techniques. As a consequence, packets of interest can be extracted from massive volumes of stored packets with relatively little compute time.

Thus, these embodiments provide a technical solution to a technical problem. The problem is the inability of prior approaches to be able to efficiently locate certain stored packets within files containing millions or billions of packets. The solution involves applying pre-processing to the stored packets to generate indexes matching filter specifications, and then using these indexes to look up (locate) the packets of interest within storage. Nonetheless, these solutions may solve other problems than the one stated. Further, the description above is just a high-level overview, and relevant technical details are provided herein.

Figure 6:
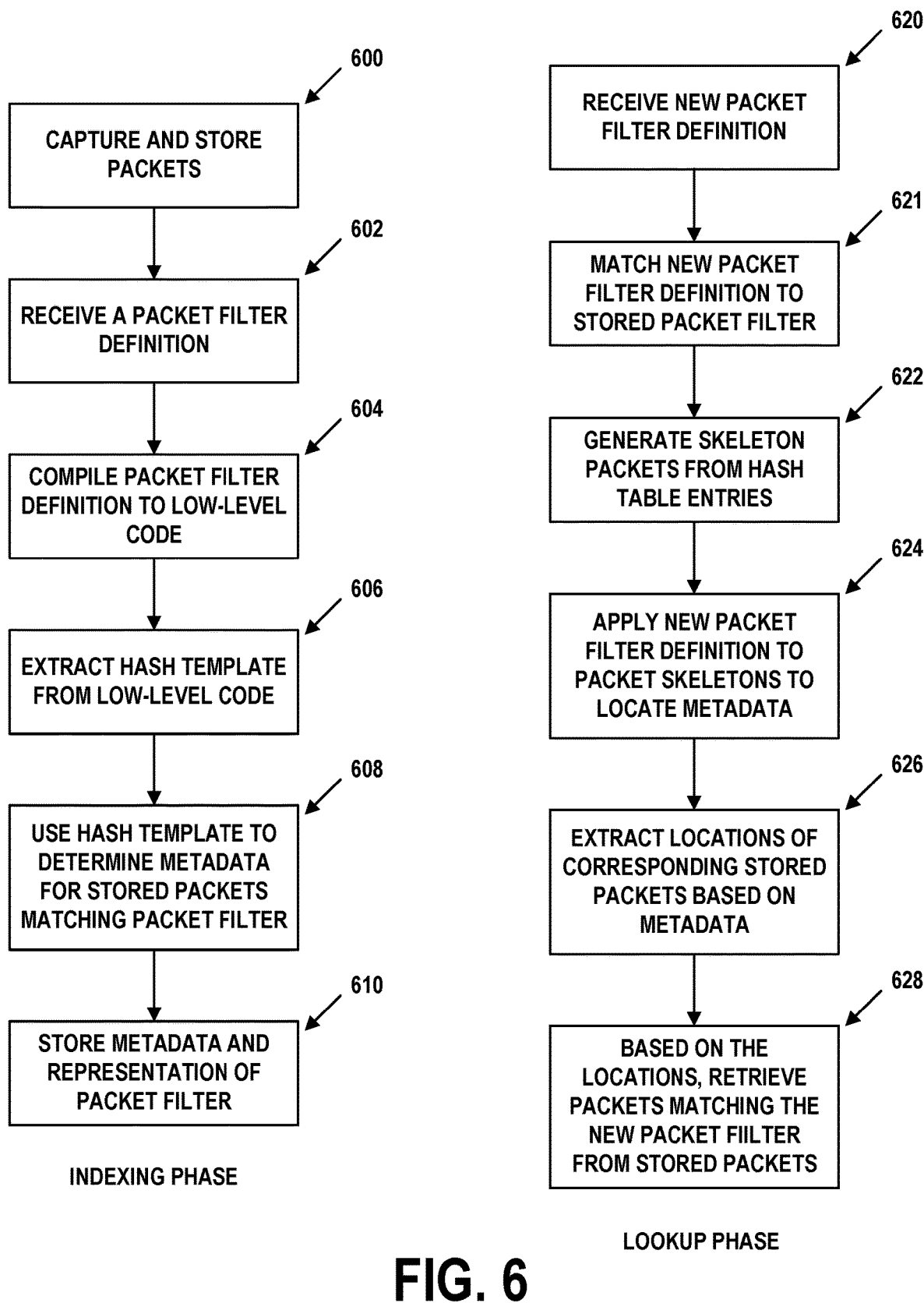
FIG. 6 depicts indexing and lookup phases, in accordance with example embodiments.

To that point, FIG. 6 depicts an overview of the indexing and lookup phases. The following subsections will describe the steps of these phases in more detail.

Block 600 may begin the indexing phase with capturing of packets. As noted, this capturing may occur on a computing device or packet capture device, and the captured packets may be stored locally on that device or in remote storage. In some cases, the steps of the indexing phase may occur as the packets are captured and before they are stored.

In others, these steps may take place after the packets are stored. It is assumed, for sake of simplicity, that PCAP files are used to represent the stored packets, but other representations are possible.

Block 602 may involve receiving a packet filter definition. At some point before, during, or after the packets are captured and stored, the packet filter definition may be received. This definition can be pre-defined and read from memory or provided by a user. The packet filter definition may be a textual packet filter expression as described above (e.g., "host 10.0.0.2 and tcp" to capture all TCP packets to and from the device with the IP address 10.0.0.2, or "port 67 or port 68" to capture all DHCP packets), or otherwise compatible with the libpcap application library.

Block 604 may involve compiling the packet filter expression to low-level code. Particularly, this low-level code may be compatible with that of the Berkeley Packet Filter (BPF). Thus, the low-level code may be instructions for a BPF-compatible virtual machine disposed within packet capture module 408 for example. The mechanics of the BPF are described below. This compilation step may occur before, during, or after the packets are captured and stored.

Block 606 may involve extracting a hash template from the low-level code as described in more detail below. The hash template can be formed based on certain types of instructions in the low-level code. The hash template defines locations in the packets that will be considered when applying the filter.

Block 608 may involve applying the hash template to the stored packets in order to determine metadata for those that match that filter. This metadata may include, for example, an overall byte count of the matching packets, an overall packet count of the matching packets, timestamps of when the matching packets were captured, and/or a list of offsets within the storage at which the packets are stored. Other types of metadata information may include the number of packets with frame check sequence (FCS) errors or checksum errors, etc. Various types of storage arrangements may involve at least one, two, or three dimensional offsets (discussed in more detail below) for example.

Block 610 may involve storing the metadata in one or more metadata files, as well as a representation of the packet filter. Advantageously, the sizes of these metadata files are significantly smaller than those of the stored packets.

The indexing phase may take place at any point during or after the packets are captured. Thus, it can be a process that is executed in real time, periodically, or on demand. Further, the indexing phase may occur for multiple packet filters, with metadata files generated accordingly.

At some point after indexing is complete or between instances of indexing, the lookup phase may take place. The lookup phase may involve a user or application seeking to find a subset of the stored packets (e.g., a particular transaction, type of transaction, network traffic involving one or more hosts, etc.). Notably, each time a lookup occurs, a new instance of the lookup phase is performed.

Block 620 may involve receiving a new packet filter definition. This definition may again be a textual expression compatible with the libpcap application library, and specifies the packets that are being looked up. In other words, the packets sought are those that match this new packet filter definition. The new packet filter definition may specify one or more locations within the bytes of a packet and values that could appear at these locations.

Block 621 may involve matching the new packet filter to one or more stored representations of the packet filters used during the indexing phase. Each stored packet filter may be associated with a single hash table, and therefore this matching may identify a hash table with entries relevant to the new packet filter.

Block 622 may involve generating skeleton packets for each of the hash table entries of the identified hash table. These skeleton packets include null values (e.g., zeros) for all bytes aside from those otherwise specified in the packet filter definition. This results in a full packet with only fields of interest populated with non-null values. The skeleton packets may be stored in main memory (e.g., RAM), a single file, or multiple files, and may be associated with their respective metadata files. Notably, in some cases, skeleton packets may be generated during the indexing phase rather than during the lookup phase. Nonetheless, one advantage of generating the skeleton packets during the lookup phase is that it reduces the amount of storage needed, as the skeleton packets can be generated in response to receiving a lookup request and then deleted after the lookup is complete.

Block 624 may involve applying the new packet filter definition to the skeleton packets. This may involve determining, for each skeleton packet, whether it matches the values of the packet filter definition. When there is a match, the metadata of the hash table entry associated with the skeleton packet contains the byte count, the packet count, timestamps, and/or the list of offsets within the storage at which the packets matching the new packet filter definition are located.

Block 626 may involve extracting locations of the stored packets matching the new packet filter definition based on the metadata. This may involve traversing the list of offsets and determining, for each offset, a storage address.

Block 628 may involve retrieving the packets located at each of these storage addresses. These packets match the new packet filter definition. Once the packets are retrieved, then may be stored individually, assembled into a single PCAP file for convenience and then stored, provided for display on a user interface, or made subject to further processing.

An optional step that could take place after block 628 is to apply the new packet filter definition to the retrieved packets. This could focus the lookup results in the case that the retrieved packets are over-inclusive in comparison to the new packet filter definition.

Another optional step is to use the timestamps to calculate microburst timing information such as start/end times and/or combining this information with other metadata to generate additional metrics, all without retrieving any full packets.

This technique results in lookups taking far less time and compute resources (e.g., processing) than if the stored packets were searched. By indexing the stored packets prior to lookup, each lookup takes orders of magnitude less processing because only the indexes are searched. Once a match is found for a packet filter definition, the associated packets can each be located in and retrieved from storage in constant time.

A. Indexing Phase

The following subsections describe each of these steps in more detail. Nonetheless, each step may be performed in various ways and the descriptions herein are non-limiting. Further, some steps may be omitted and the ordering of the steps may be different.

1. Capturing and Storing Packets

At block 600, a computing device or packet capture device may capture some number of packets. Further, these packets may be stored locally to that device or remotely. The captured packets may be stored in one or more PCAP files for example, and these PCAP files may be disposed on the same storage medium (e.g., SSD or HDD) or across multiple storage media. In some cases, the stored packets may number in the millions or billions and take up terabytes of storage space.

2. Receiving a Packet Filter Definition

At block 602, a packet filter definition may be received. As noted, this may be a textual representation of a packet filter, such as "(host 192.168.1.1) and udp and port 80". This particular example packet filter definition would match any packet transmitted from or to a host with the IP address 192.168.1.1, where the packets have a transport layer protocol of UDP and a transport layer port of 80. Alternatively, non-textual representations may be possible.

The packet filter definition may be entered by a user by way of a graphical user interface, command line, or some other input mechanism. Alternatively, the packet filter definition may be read from a file or could otherwise be pre-defined.

3. Compiling the Packet Filter Definition to Low-Level Code

Figure 7A:
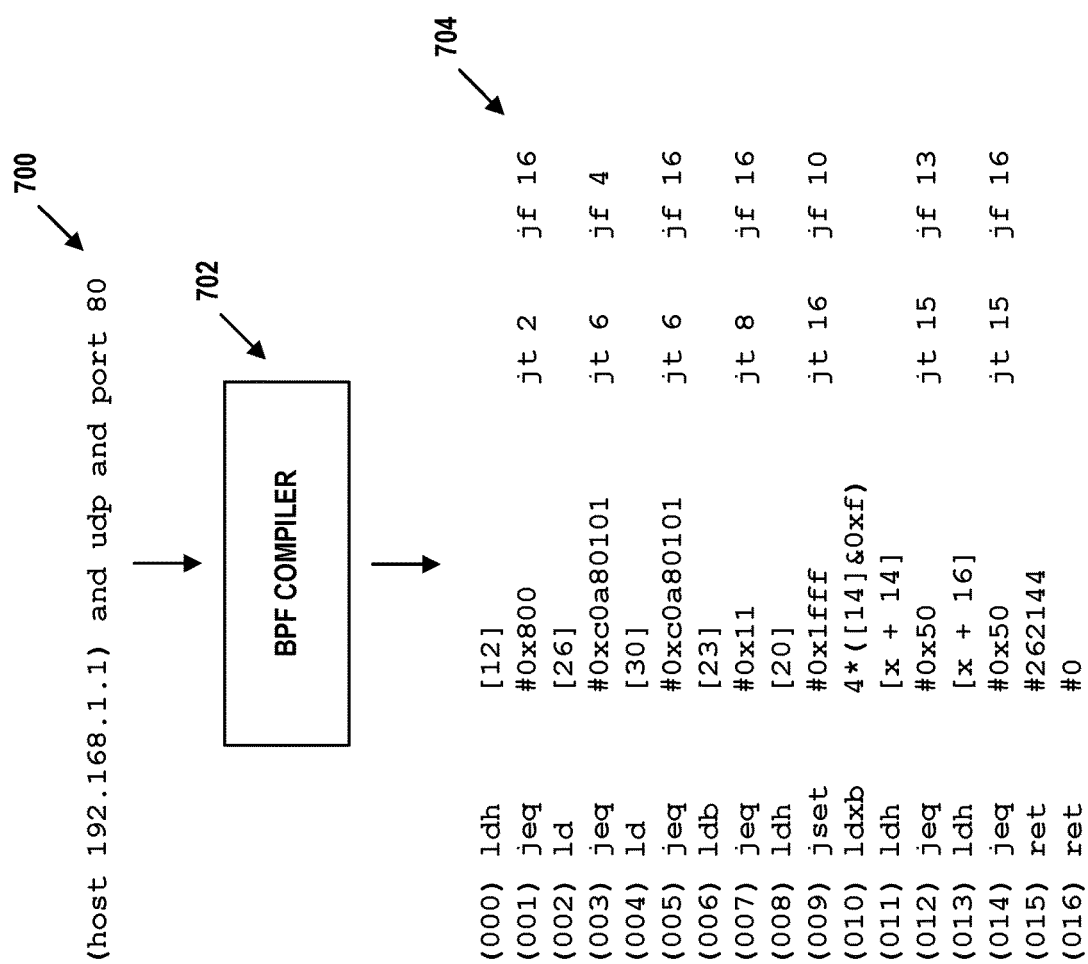
FIG. 7A depicts a packet filter expression being compiled into low-level code, in accordance with example embodiments.

At block 604, the packet filter definition is compiled to low-level code. FIG. 7A depicts an example of the input and output of such a process.

Packet filter definition 700 is a textual representation of a filter expression, as discussed above. BPF compiler 702 is applied to packet filter definition 700 to generate low-level code 704. As can be seen, low-level code 704 resembles an assembly language and can be executed by a virtual machine with a kernel or application space to filter packets (e.g., with packet capture module 408). The virtual machine uses an accumulator to temporarily store values on which it operates, an index register to temporarily store an additional value, and a program counter to point to the next instruction to execute. A description of low-level code 704 follows with a detailed example for purposes of illustration.

Low-level code 704 as shown consists of 17 instructions, numbered 000-016. Each instruction may be in a fixed-length format consisting of a 16-bit opcode, an 8-bit jt field, an 8-bit jf field, and 32-bit k field that is used for various purposes based on the opcode. FIG. 7B depicts this format in table 710. FIG. 7B also provides the address modes supported by each instruction in table 712 and a description of address mode semantics in table 714.

Each of the instructions appearing in low-level code 704 is defined as follows. Nonetheless, other instructions may be used in low-level code.

The load half-word instruction (ldh) loads 16 bits from the given offset in the packet. Thus, instruction 000 of low-level code 704 loads 16 bits starting at byte offset 12 in the packet into the accumulator.

The jump on equal instruction (jeq) compares the value in the accumulator to the value referenced by the k field. When these values are equal, the program counter is moved to the instruction number in the jt field, and when these values are not equal the program counter is moved to the instruction number in the jf field. Thus, instruction 001 of low-level code 704 compares the value of the accumulator to 0x800, then jumps to instruction 002 when they are equal or to instruction 016 otherwise.

The load instruction (ld) loads 32 bits from the given offset in the packet. Thus, instruction 002 of low-level code 704 loads 32 bits starting at byte offset 26 in the packet into the accumulator.

The load byte instruction (ldb) loads 8 bits from the given offset in the packet. Thus, instruction 006 of low-level code 704 loads 8 bits starting at byte offset 23 in the packet into the accumulator.

The jump set instruction (jset) performs a bitwise AND of the value in the accumulator and the value referenced by the k field. When the resulting value is non-zero, the program counter is moved to the instruction number in the jt field. When the resulting value is zero, the program counter is moved to the instruction number in the jf field. Thus, instruction 009 of low-level code 704 computes the bitwise AND of the value in the accumulator and 0x1fff, then jumps to instruction 016 when they are equal or to instruction 010 otherwise.

The load index byte instruction (ldxb) loads 8 bits from the given offset in the packet into the index register. In some cases, bitwise operations can be performed to this value as part of the loading process. Thus, instruction 010 of low-level code 704 loads 8 bits starting at byte offset 14 in the packet into the index register, performs a bitwise AND on this value with 0xf and then multiplies the result by 4.

The return instruction (ret) terminates the filtering, indicates whether the packet matches the packet filter expression, and if so how many bytes of the packet to save. Thus, instruction 015 is executed when there is a match between the packet and the packet filter expression, and 262144 bytes (a large default value indicating the entire packet) are saved. In contrast, instruction 016 is executed when there is no match and indicates that 0 bytes are saved.

Other instructions may be possible. These could include a nibble (4-bit) load instruction, for example.

Figure 7C:
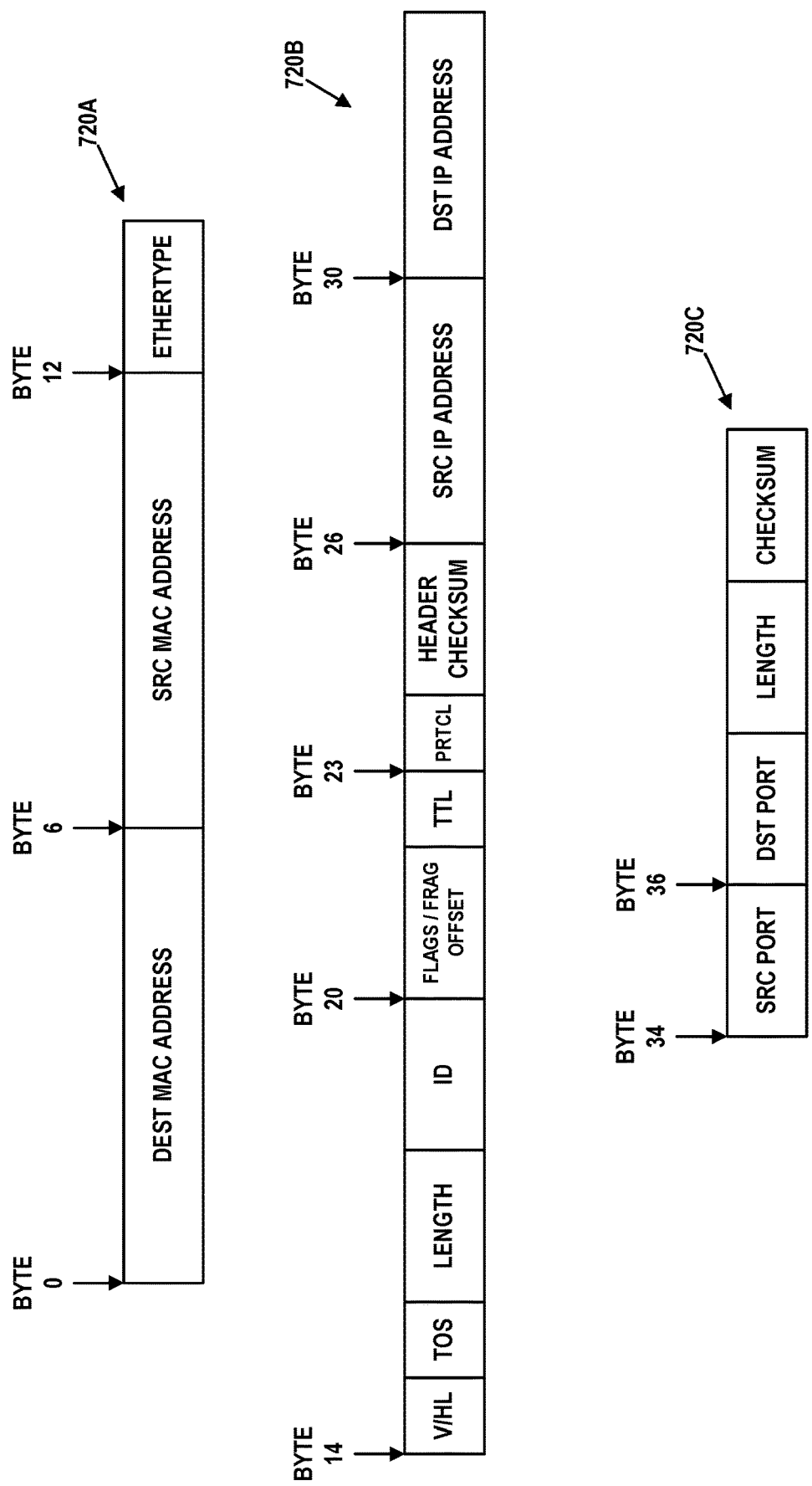
FIG. 7C depicts Ethernet, Internet Protocol, and User Datagram Protocol headers, in accordance with example embodiments.

To further specify how low-level code 704 would serve to filter actual packets (or in this case, frames), FIG. 7C depicts an Ethernet frame that encapsulates an IP packet, which in turn encapsulates a UDP segment. To that end, FIG. 7C depicts Ethernet header 720A, IP header 720B, and UDP header 720C. These headers are depicted separately in FIG. 7C for purposes of convenience. However, in an Ethernet frame, IP header 720B would directly follow Ethernet header 720A (i.e., the leftmost (first) bit of IP header 720B would follow the rightmost (last) bit of Ethernet header 720A) and UDP header 720C would directly follow IP header 720B (i.e., the leftmost (first) bit of UDP header 720C would follow the rightmost (last) bit of IP header 720B).

Given that, each of the headers is labeled with byte numbering of interest. Thus, Ethernet header 720A begins with byte 0, IP header 720B begins with byte 14, and UDP header 720C begins with byte 34. These numbers indicate the location of their bytes in the packet, with the count starting at 0.

When executed, low-level code 704 would begin with instruction 000, which loads 16 bits beginning from byte 12 of the packet. This would result in the 2-byte ethertype field being read from Ethernet header 720A. By convention, ethertype fields take on a value of 0x800 when the encapsulated protocol is IP. Thus, instruction 001 compares the value of the ethertype field to 0x800. If they are equal, control progresses to instruction 002. Otherwise control progresses to instruction 016 (which terminates the filtering for the packet by indicating that the packet does not match the filter).

Instruction 002 loads 32 bits beginning from byte 26 of the packet. This would result in the 4-byte source IP address field being read from IP header 720B. Instruction 003 compares the value of this field with 0xc0a80101, which is the hexadecimal representation of the dotted-decimal IP address 192.168.1.1. If they are equal, control progresses to instruction 006. Otherwise control passes to instruction 004.

Instruction 004 loads 32 bits beginning from byte 30 of the packet. This would result in the 4-byte destination IP address field being read from IP header 720B. Instruction 005 compares the value of this field with 0xc0a80101. If they are equal, control progresses to instruction 006. Otherwise control passes to instruction 016.

The end result of instructions 002-005 is that the filter terminates indicating that the packet does not match unless one of the source IP address or destination IP address is set to 192.168.1.1.

Instruction 006 loads 8 bits beginning from byte 23 of the packet. This would result in the 1-byte protocol field being read from IP header 720B. By convention, protocol fields in IP headers take on a value of 0x11 (17 in decimal) when the encapsulated protocol is UDP. Thus, instruction 007 compares the value of the protocol field to 0x11. If they are equal, control progresses to instruction 008. Otherwise control progresses to instruction 016.

Instruction 008 loads 16 bits beginning from byte 20 of the packet. This would result in the 2-byte flags/fragmentation offset field being read from IP header 720B. The first three bits of this field are each 1-bit flags, and the remaining 13 bits are a fragmentation offset. The fragmentation offset only has a non-zero value when a packet is a non-initial fragment of a larger IP packet. Thus, instruction 009 performs a bitwise AND of the flags/fragmentation offset field to make this determination. If the result is non-zero, the packet is a non-initial fragment and control progresses to instruction 016. Otherwise control passes to instruction 010.

Instruction 010 loads 8 bits beginning from byte 14 of the packet into the index register. This would result in the 1-byte version/header length field being read from IP header 720B. The first four bits of this field represent the IP version (e.g., 4) and the second four bits represent the length of IP leader 720B in 32-bit words. Instruction 010 also masks out the IP version (so that only the header length is considered) and multiplies this value by 4. The result is the number of bits in IP header 720B, which is stored in the index register and represented as x. For purposes of this example, x has a value of 20 and is used as an offset by further instructions.

Instruction 011 loads 16 bits beginning from the byte x+14 (e.g., byte 34). This would result in the 2-byte source port field being read from UDP header 720C. Instruction 012 compares the value of the source port field to 0x50 (80 in decimal). If they are equal, control progresses to instruction 015. Otherwise control progresses to instruction 013.

Instruction 013 loads 16 bits beginning from the byte x+16 (e.g., byte 36). This would result in the 2-byte destination port field being read from UDP header 720C. Instruction 014 compares the value of the destination port field to 0x50 (80 in decimal). If they are equal, control progresses to instruction 015. Otherwise control progresses to instruction 016.

The end result of instructions 011-014 is that the filter terminates indicating that the packet does not match unless one of the source port or destination port is set to 80.

As noted, if execution of low-level code 704 reaches instruction 015, the filter terminates indicating that the packet was a match. But if execution of low-level code 704 reaches instruction 016, terminates indicating that the packet was not a match.

4. Extracting a Hash Template

Turning back to FIG. 6, block 606 may involve extracting a hash template from the low-level code. This hash template may define locations (e.g., byte offsets and associated byte counts) that define where in packets the packet filter expression is to extract data.

Based on the discussion of FIGS. 7A-7C, it should be clear that a textual packet filter definition (such as packet filter definition 700) is an easily-understood, human readable way of expressing a packet filter. Many different types of packet filters can be defined using such expressions, with the ability to filter packets based on content of any bytes within those packets. It should also be clear that the generated low-level code (such as low-level code 704) uses various types of load instructions (e.g., ldh, ld, ldb, and ldxb) to access bytes of a packet. In fact, the bytes of the packet that are used by the filter can be identified just by considering the load instructions.

Given this observation, the relevant bits and/or bytes of a packet that determine whether a packet filter expression is matched can be identified just from the load instructions in the low-level code to which the expression is compiled. Thus a hash template can be determined for the packet filter expression based on extracting load instructions from the low-level code.

Figure 8A:
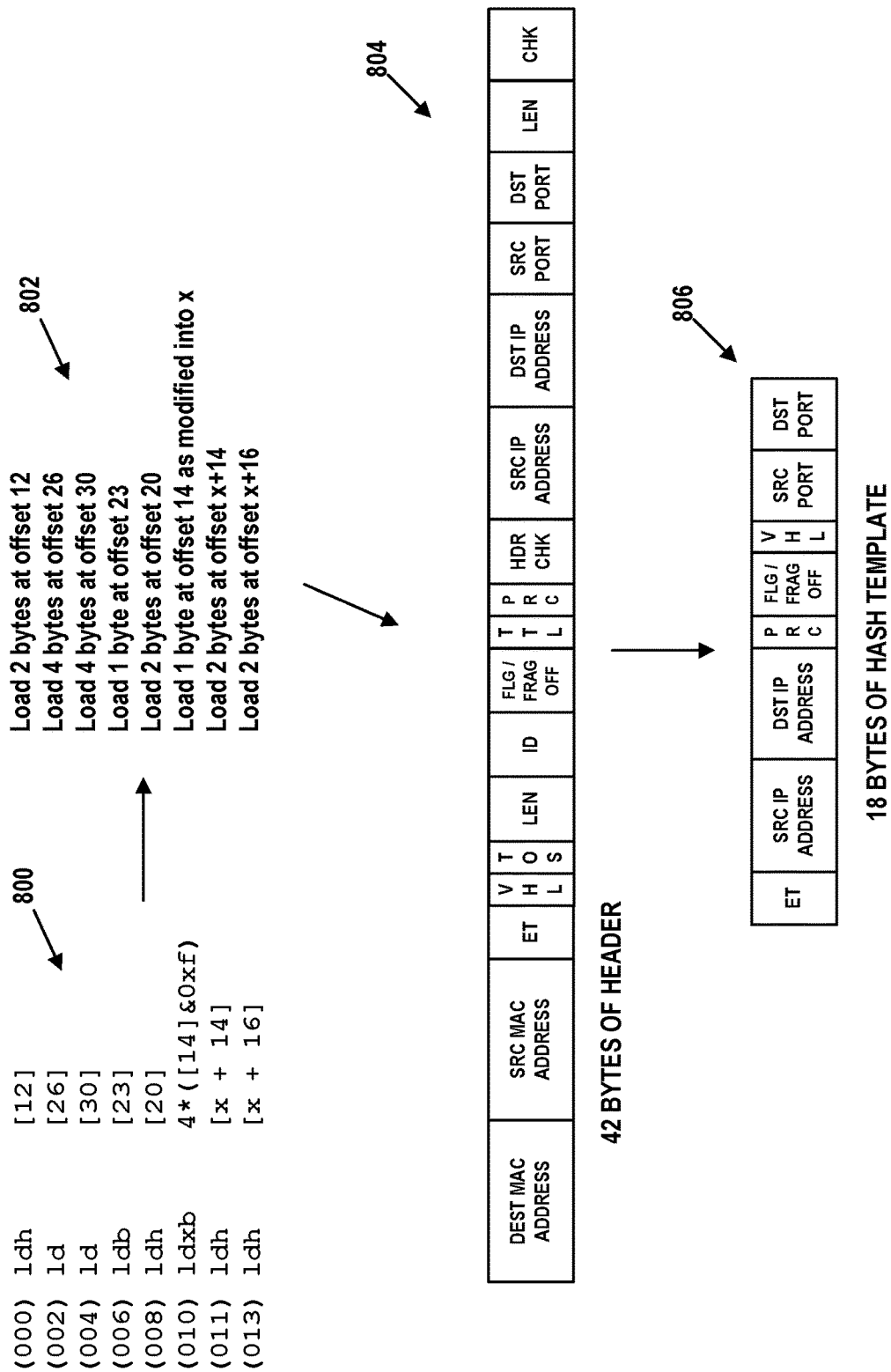
FIG. 8A depicts generation of a hash template, in accordance with example embodiments.

FIG. 8A depicts how such a hash template would be extracted. Modified low-level code 800 includes just the load instructions from low-level code 704. These instructions could be extracted from low-level code 704 or generated directed by a custom compiler. Descriptions 802 specify what each instruction does, respectively. For instance, instruction 000 loads 2 bytes at offset 12, and instruction 010 loads 1 byte at offset 14 as modified into the index register (x).

Packet header 804 provides the Ethernet, IP, and UDP headers of an example packet that matches the formats shown in FIG. 7C. This totals 42 bytes of header (14 Ethernet, 20 IP, and 8 UDP). Any UDP payload is not shown for purposes of simplicity, but load instructions (and thus a hash template) could use data in such a payload. Hash template 806 is generated by identifying the bytes of packet header 804 that would be loaded by the instructions of modified low-level code 800.

5. Using a Hash Table to Determine Metadata

Turning back to FIG. 6, block 608 may involve using such a hash template to determine metadata for stored packets that match the packet filter expression. Once this hash template has been identified, it can be applied to generate a hash table that classifies a plurality of packets (stored or as part of the capture process). Such a hash table, as well as its associated data and processing, is depicted in FIG. 8B.

Figure 8B:
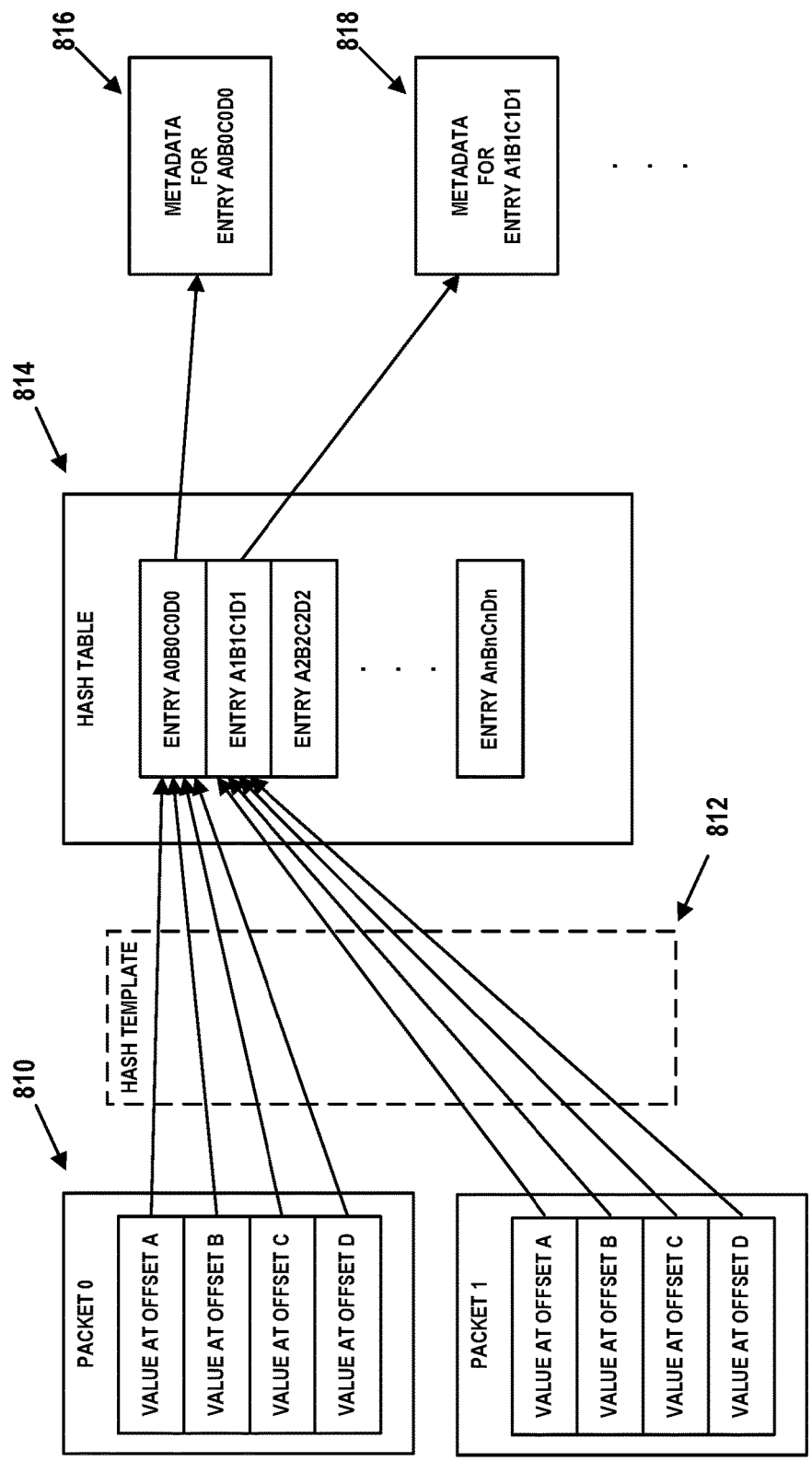
FIG. 8B depicts mapping packets to a hash table, in accordance with example embodiments.

Particularly, FIG. 8B shows a sequence or array of captured packets 810, including packet 0, packet 1, and some number of additional packets as indicated by the ellipsis. Each of packets 810 contain data at offsets A, B, C, and D, for example. These offsets may begin at various bytes within the packets, and need not be contiguous.

As discussed in the context of FIG. 8A, a hash template may define hash function based on such offsets and a number of bytes beginning at each offset. In some cases, the hash template might specify additional processing on these bytes, such as masking out certain bits or calculating derivative values. Further, the bytes identified by the hash template might also be passed through a cryptographic hash function to map them to a 256-bit to 512-bit digest, this digest being used in the hash table.

In FIG. 8B, hash template 812 is applied to each of packets 810 to populate hash table 814. Thus, the values of bytes referenced by the offsets are used to map each of packets 810 to a hash table entry. For example, assuming that the hash for packet 0 is A0B0C0D0, the associated entry in hash table 814 will be updated. Likewise, assuming that the hash for packet 1 is A1B1C1D1, the associated entry in hash table 814 will be updated. This is shown in FIG. 8B by the arrows from packet 0 to the first entry in hash table 814 and the arrows from packet 1 to the second entry in hash table 814. To be clear, packet 0 and packet 1 result in different values when the hash template is applied. Thus, their bytes accessed by the low-level code have at least some values that are different from one another.

As noted above, the hash table entries may include or refer to various types of metadata relating to the matching packets. Thus, each entry in hash table 814 may include or refer to its own metadata. As shown in FIG. 8B, the first entry in hash table 814 refers to metadata 816 and the second entry in hash table 814 refers to metadata 818.

As suggested by FIG. 8B, a large number packets 810 (e.g., millions or billions) may be mapped to tens, hundreds, or thousands of possible hash table entries. Each of these entries may be associated with its own set of metadata. Examples of the metadata are shown in FIG. 8C.

To that point, metadata 816 and 818 may include one or more of a total packet count, a total byte count, and a trace array that includes storage addresses of packets. Particularly, metadata 816 contains total packet count 820 (which is a total number of packets that hash to A0B0C0D0), total byte count 822 (which is a total number of bytes from of packets that hash to A0B0C0D0), trace array 824 (which includes a list of one or more storage addresses of packets that hash to A0B0C0D0), and timestamp array 825 (which includes a list of one or more timestamps of packets that hash to A0B0C0D0). Likewise, metadata 818 contains total packet count 826 (which is a total number of packets that hash to A1B1C1D1), total byte count 828 (which is a total number of bytes from of packets that hash to A1B1C1D1, trace array 830 (which includes a list of one or more storage addresses of packets that hash to A1B1C1D1), and timestamp array 832 (which includes a list of one or more timestamps of packets that hash to A1B1C1D1).

The storage addresses may arranged in several ways in order to identify where and/or how to locate specific stored packets. These arrangements are described in more detail below. Nonetheless, one possible embodiment involves all of packets 810 being stored in a single file (which could be many gigabytes in size), and the storage addresses may be byte offsets in this file where the first byte of each packet matching the associated hash can be found. This allows constant time retrieval of each packet referenced in a trace array.

In some embodiments, instead of or in addition to storage addresses in the form of offsets, the trace array may include the timestamp of when each packet was captured and/or the size (number of bytes) of these packets. Doing so allows the lookups to search packets based on these timestamps. Also, storing this additional information allows rich packet statistics to be rapidly generated from the trace arrays, such as identifying bursty transactions, number of bytes/packets per unit of time (e.g., bandwidth), etc.

Notably, there is one hash table per packet filter definition used for indexing. Therefore, the embodiments herein may involve populating a different hash table for each packet filter used for indexing.

In addition, this processing may be performed in parallel on multiple processors to improve the indexing performance. The packets or groups thereof may be distributed in any reasonable fashion to the processors (e.g., round-robin or randomly). The output using multiple processors is one hash table per packet filter definition per processor. The multiple hash tables per packet filter definition can be merged back into a single table upon completion of parallel processing.

6. Storing Metadata and a Representation of the Packet Filter

Turning back to FIG. 6, block 610 may involve storing metadata and a representation of the packet filter for later use during the lookup phase.

Metadata may be stored in various ways. In some embodiments, all metadata is stored in a single file. In others, the packet and byte counts are stored in one file per hash table entry and the trace array is stored in another file per hash array. Offsets in the trace array may be delta-encoded (where the (n+1)th entry in the array is encoded as a difference from the nth entry). Doing so saves storage space since the high-order bits of the offsets may be static for many addresses appearing consecutively or close to one another in the trace array. Moreover, various types of compression may be applied to the trace array (e.g., Huffman coding) to save further storage space. Additional possibilities exist.

In experiments performed on actual stored packets, it was found that the hash table and trace arrays take up approximately 1/500th to 1/1000th the space of the packets they represent. As an example, a 953 megabyte file of stored packets was found to have a hash table of 276 kilobytes and a trace array of 1.3 megabytes for a reasonable number of realistic packet filter expressions.

In situations where an intractably large amount of captured packets would otherwise be stored for an extended period of time (e.g., 100 terabytes of packets being captured per day and stored for 365 days on a rolling basis), the embodiments herein allow the raw captured packets to be deleted once they are indexed and the metadata is generated. Thus, the embodiments herein can also serve as a way of dramatically compressing captured packets while retaining features of interest therein.

Further, a representation of each packet filter used to index the stored packets may also be stored. This would include those for initial packet filter expressions as well as derived packet filter expressions (see below). In some embodiments, these representations may include a list of offsets and byte lengths per offset that can be determined from the associated packet filter expressions (refer back to FIGS. 7A and 8A for a description of how the offsets and byte lengths are generated from a packet filter expression).

7. Additional Indexing Features

In addition to the aspects of the indexing phase described above, other operations may take place and further information may be stored. These involve using multiple derived packet filter expressions for indexing as well as storing representations of all packet filters used for indexing.

An initial packet filter expression used for indexing may be expanded for purposes of broadening coverage. As an example, suppose that a user enters a packet filter expression of "ip and net 192.168.1 and tcp and port 80". This expression would match any Ethernet frame containing a packet to or from an IP address in the subnet 192.168.1.0/24 that encapsulates a TCP header with a source or destination port of 80. Notably, the expression is agnostic to the data link layer protocol used to encapsulate the packets. But, since different data link layer protocols have different header sizes, the byte offsets of interest can be different depending on which data link layer protocol is used.

Therefore, this initial expression can be expanded into a number of derived expressions, perhaps one for each data link layer of interest. Examples of these derived expressions can include "vlan and ip and net 192.168.1 and tcp and port 80" to capture Ethernet frames with VLAN tags, and "mpls and ip and net 192.168.1 and tcp and port 80" to capture multiprotocol label switching (MPLS) frames. In some cases, further derived expressions can be used to capture address resolution protocol (ARP) and reverse address resolution protocol (RARP) frames that include an IP address in the subnet 192.168.1.0/24 (i.e., "arp and net 192.168.1" and "rarp and net 192.168.1", respectively).

This expansion of an initial packet filter expression can be performed manually by a user or automatically by the system. Other expansion strategies may be possible.

B. Lookup Phase

The lookup phase executes on the stored packet filter representations, the hash table, and the metadata to locate captured packets. Since the hash table and metadata are expected to be dramatically smaller in storage requirements than the captured packets, doing so improves lookup performance. In experiments, the embodiments herein facilitate lookups that can be 500 times faster than those of the prior art.

The lookup phase allows a user or other entity to enter a new packet filter expression, and will return representations of packets and/or their related metadata that match this expression. Since this phase only considers indexed packets, it requires that indexing has occurred for this new packet filter expression or a superset thereof during the indexing phase. Otherwise, nothing will be returned even if there are unindexed matches in the actual captured packets. Nonetheless, with proper use of indexing with a rich enough set of packet filter expressions, this requirement is quite manageable in practice.

1. Receiving a New Packet Filter Definition

Turning back to FIG. 6, block 620 may involve receiving a new packet filter definition. As discussed above, this may be a textual packet filter expression (e.g., "(host 192.168.1.1) and udp and port 80") entered by a user, read from a file, or provided in some other manner. The new packet filter expression may represent a subset of the stored packets that are of interest.

2. Matching New Packet Filter Definition

Block 621 may involve matching the new packet filter definition to one or more of the stored packet filter definitions. Doing so can include compiling the new packet filter definition to low-level code and extracting the offsets and numbers of bytes read per offset from the load instructions of the low-level code, as described above. Then these offsets are matched to those of the stored packet filter definitions to identify a hash table.

Figure 9A:
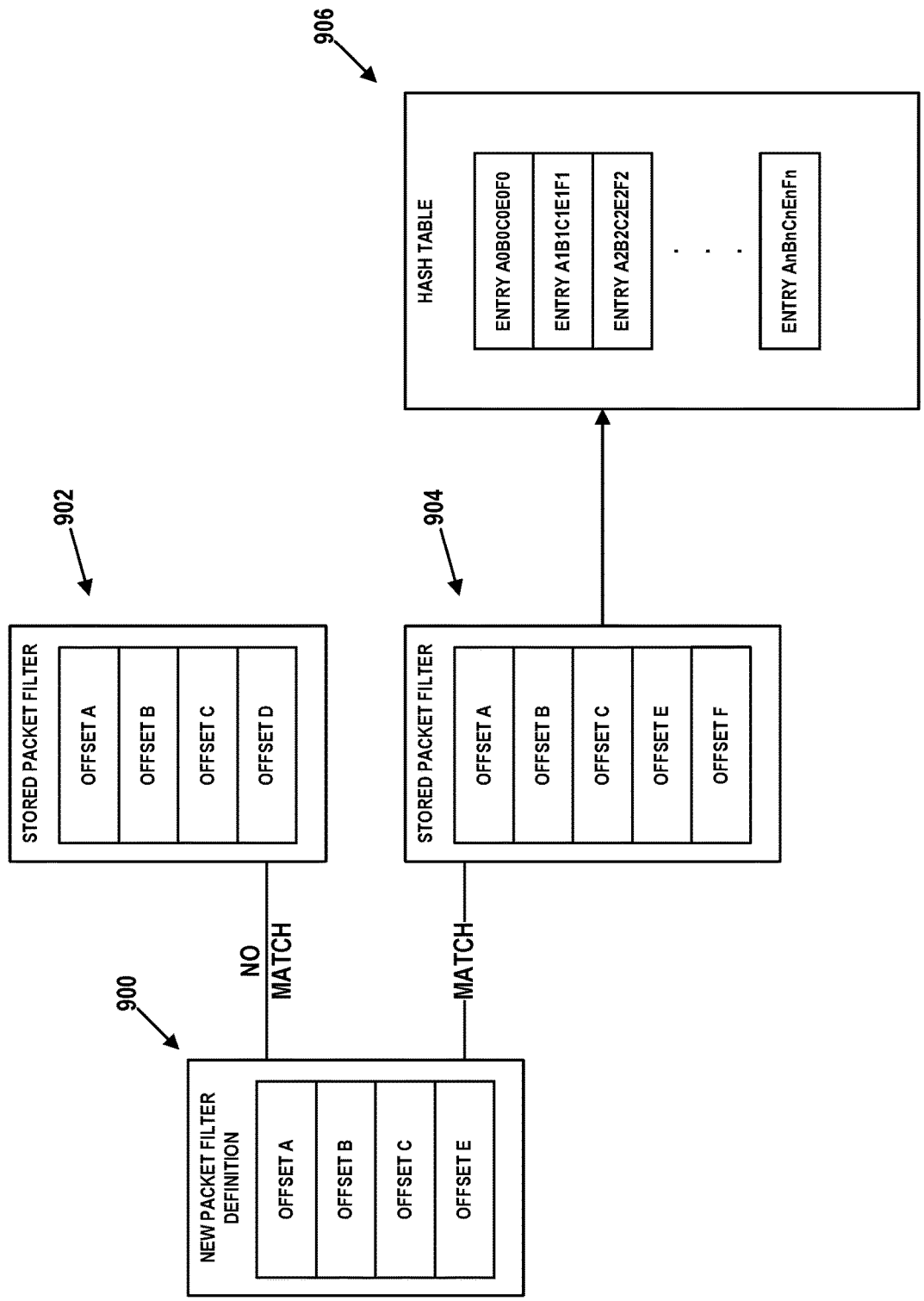
FIG. 9A depicts identifying a hash table from a new packet filter definition, in accordance with example embodiments.

FIG. 9A depicts this process. For purposes of illustration, the example used in FIG. 9A is slightly different from the examples used to describe the indexing process.

New packet filter definition 900 considers bytes at offsets A, B, C, and E (here, the "offsets" represent the starting byte of one or more bytes containing information of interest). These offsets are compared to those of the stored packet filters. In FIG. 9A, these are two stored packet filters 902 and 904. New packet filter definition 900 does not match stored packet filter 902 because offset E does not appear in stored packet filter 902. However, new packet filter definition 900 does match stored packet filter 904 because offsets A, B, C, and E all appear in stored packet filter 904. Even though the offsets of stored packet filter 904 comprise a superset of those of new packet filter definition 900, this is still considered a match.

Thus, a new packet filter matches a stored packet filter when all offsets of the new packet filter are found in the stored packet filter. In some cases, multiple stored packet filters can match a new packet filter. In these cases, the process described below may be carried out for all matching stored packet filters.

After stored packet filter 904 is identified as a match, its associated hash table, hash table 906, is identified. As described above, this hash table contains hash table entries for stored packets with values matching those of the new packet filter at the specified offsets within the packets.

3. Generating Skeleton Packets from Hash Table Entries

Turning back to FIG. 6, block 622 may involve generating skeleton packets from hash table entries. Notably, one skeleton packet per hash table entry in the identified hash tables may be generated.

FIG. 9B depicts this process. Hash table 906 contains entries for specific values of various bytes specified by a stored packet filter (e.g., A0B0C0E0F0 and A1B1C1E1F1). For each entry a skeleton packet is created. Here, a skeleton packet consists of a sequence of bytes that would normally appear in a captured packet, but with all bits therein taking on a default value (e.g., all 0's or all 1's) except for those of the bytes identified by the stored packet filter. The identified bytes have the values of the associated hash table entry.

As an example, FIG. 9B depicts skeleton packets 908, one for each hash table entry. Thus, there is a skeleton packet for hash table entry A0B0C0E0F0, another for hash table entry A1B1C1E1F1, and so on. Expanded skeleton packets 910 and 912 provide illustrations of the layouts of such skeleton packets for hash table entries A0B0C0E0F0 and A1B1C1E1F1, respectively. Expanded skeleton packet 910 contains the values A0, B0, C0, E0, and F0 at the associated offsets defined by the stored packet filter. Likewise, expanded skeleton packet 912 contains the values A1, B1, C1, E1, and F1 at the associated offsets defined by the stored packet filter. All other locations in these skeleton packets have the default values (e.g., all 0's or all 1's). These skeleton packets may be stored separately from one another or together in one or more common files.

4. Applying the New Packet Filter to the Skeleton Packets

Turning back to FIG. 6, block 624 may involve applying the new packet filter definition to the skeleton packets. This could encompass using the textual packet filter expression (e.g., "(host 192.168.1.1) and udp and port 80") and skeleton packets as input to a packet capture application (e.g., using libpcap, a packet capture software library supporting the PCAP format) to determine whether each skeleton packet matches the new packet filter. Matches indicate that all packets associated with the hash table entry used to generate the skeleton packet are relevant to the new packet filter.

Figure 9C:
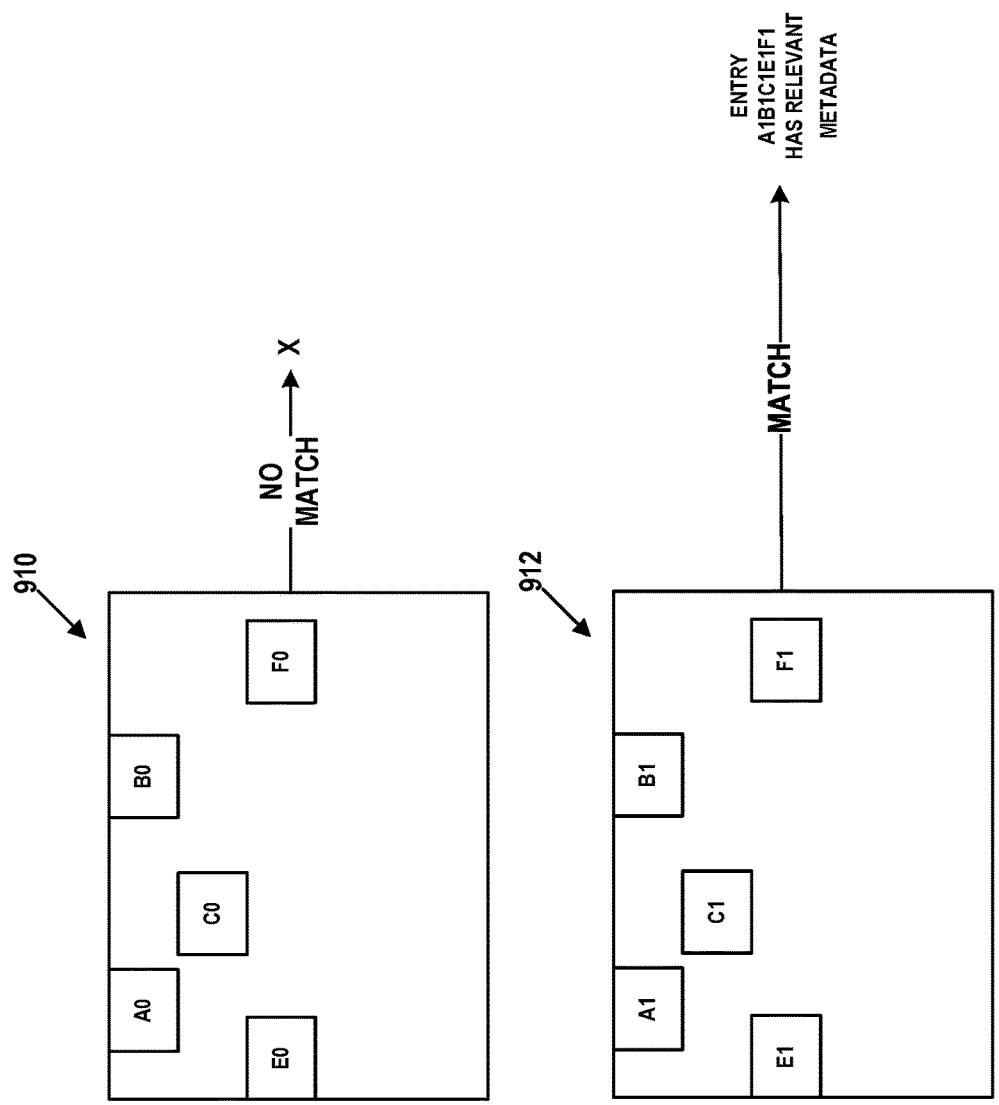
FIG. 9C depicts identifying a hash table entry from its skeleton packet, in accordance with example embodiments.

An example is shown in FIG. 9C. Expanded skeleton packet 910 does not match the new packet filter, but expanded skeleton packet 912 does match this filter. Therefore, hash table entry A1B1C1E1F1 contains metadata of relevance to the new packet filter.

5. Extracting Locations of Stored Packets from Metadata

Turning back to FIG. 6, block 626 may involve extracting locations of stored packets from this metadata of relevance. As noted above, this metadata may include a total packet count and a total byte count of stored packets associated with the matched hash entry, as well as locations and timestamps of the stored packets of interest. These locations may read from a trace array, arranged similarity to that of trace arrays 824 and 830, by iterating through the trace array and reading the storage addresses therein.

6. Retrieve Packets Matching the New Packet Filter

Block 628 may involve, based on the locations (storage addresses), retrieving packets matching the new packet filter from the stored packets. Depending on how the packets are stored, this lookup may be performed in different ways.

Figure 10A:
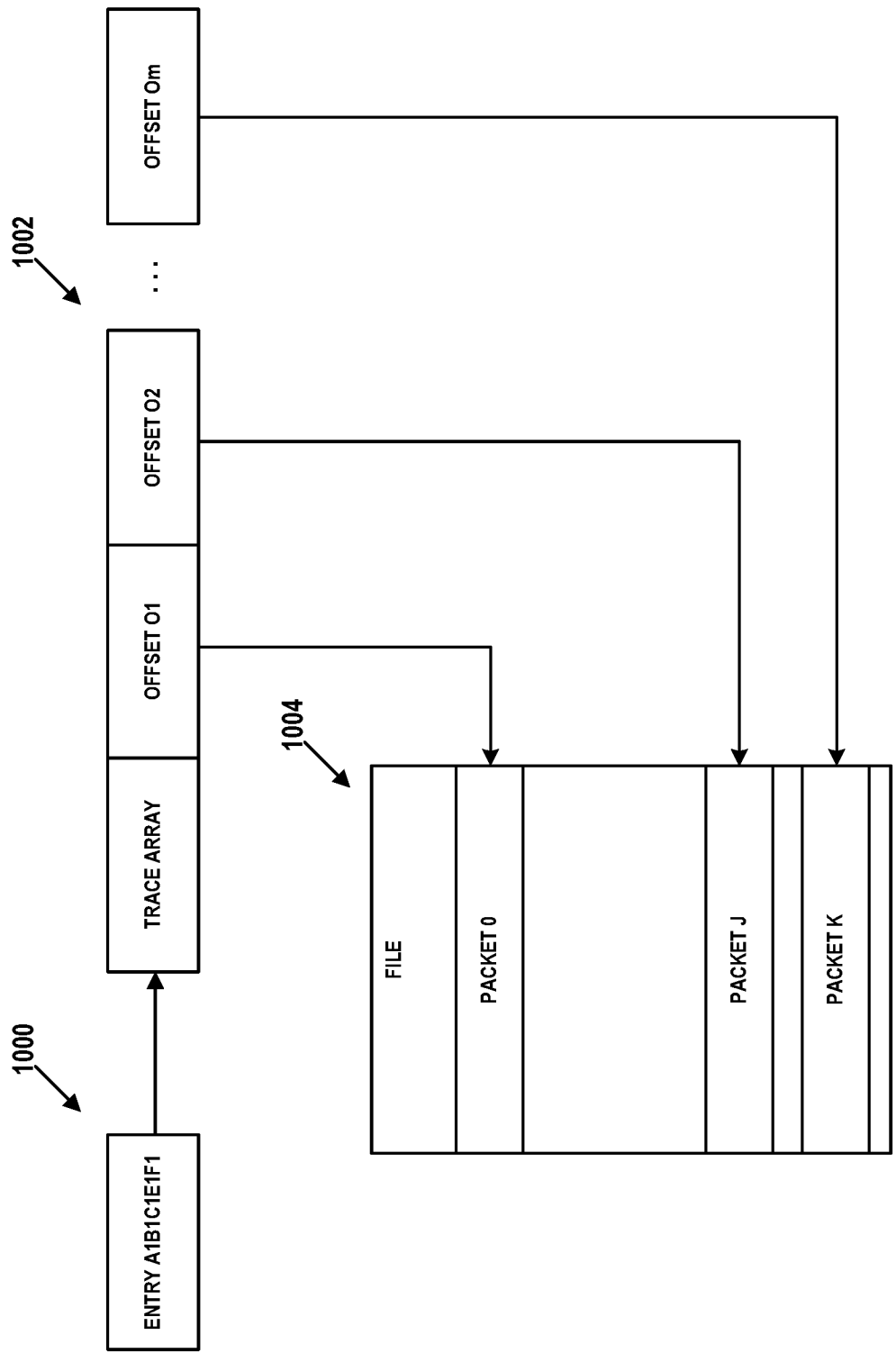
FIG. 10A depicts one-dimensional offsets indicating storage addresses of packets, in accordance with example embodiments.

Some packets may be stored with a one-dimensional storage address, such as a byte offset in a file. This implementation is shown in FIG. 10A. Hash table entry 1000 is associated with metadata including trace array 1002. Each entry in trace array 1002 points to a specific byte offset of a packet stored in file 1004. Thus, offset O1 points to packet 0, offset O2 points to packet J, offset Om points to packet K, etc. Using these entries, packets 0, J, K, and so on can be extracted from file 1004.

Figure 10B:
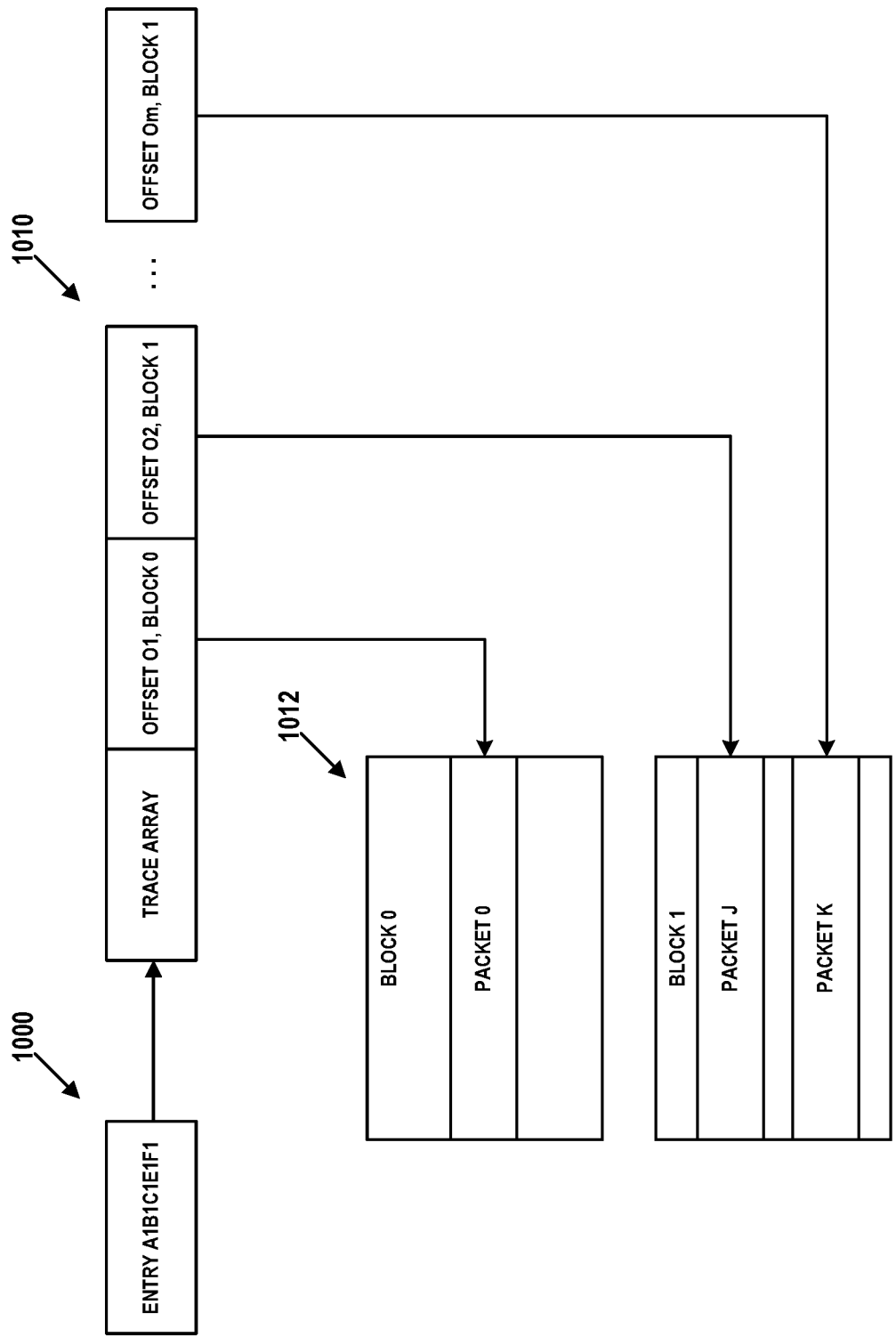
FIG. 10B depicts two-dimensional offsets indicating storage addresses of packets, in accordance with example embodiments.

An alternative mechanism of storage and addressing is shown in FIG. 10B. Here, packets are stored within an array of blocks 1012 (each block may be a file or a location in non-volatile storage, for example) and trace array 1010 contains two-dimensional addresses of byte offsets within a block. Thus, offset O1 within block 0 points to packet 0, offset O2 within block 1 points to packet J, offset Om with block 1 points to packet K, etc. Using these entries, packets 0, J, K, and so on can be extracted from blocks 1012. Alternatively, trace array 1010 might only contain indications of the block in which each packet is stored and the block would be exhaustively searched during the lookup phase. Doing so will reduce storage space for the metadata at the cost of slightly more processing during the lookup phase.

Further embodiments may involve three-dimensional indexing of stored packets (e.g., disk, file, byte offset, or block, sub-block, byte offset), or even four-dimensional indexing (e.g., disk, block, sub-block, byte offset). Other types of two-dimensional indexing may also be possible (e.g., URL, byte offset for remote storage).

Moreover, some files or blocks in which packets are stored may be associated with a checksum. This checksum would be calculated over a file or block during the capture or indexing phase and stored with metadata. Then, during the lookup phase, the checksum of the currently stored block at the location specified by the metadata is compared with the checksum in the metadata to determine whether the file or block has changed. If so, then the lookup would fail because the location of a packet within the file or block is no longer reliable (e.g., the file or block has been reused for storage of different packets).

Regardless of how they are stored, the packets matching the new packet filters can be extracted. They can then be stored together in one or more files, a database structure, or in some other fashion. As part of the extraction process, statistics on these packets may be recorded, such as total packets and/or total bytes on an aggregate or per IP address basis. Other statistics may also be calculated.

VII. EXPERIMENTAL RESULTS

Assume that there are n packets in storage, and that a packet filter definition matches k of these packets, where k<<n. A traditional search through the stored packets would require O(n) time to locate these k packets. But using the indexing procedures described herein and further assuming a single matching hash table with m hash table entries, where m<<n, the overall time required to locate the k packets would be O(k+m). Since many lookups could be performed between indexing phases, the indexing overheard is small when amortized over the lookups. Realistic values of the variables might be n=1,000,000,000, k=1000, and m=100, for example.

An experiment illustrating these improvements was conducted. A total of 302 gigabytes of packets (approximately 200 million packets) were captured and stored. Performing a conventional filtering lookup on these stored packets to identify 8 that matched a particular packet filter took several hours. But using the embodiments herein, the lookup took only 435 milliseconds, which is orders of magnitude faster.

VIII. EXAMPLE OPERATIONS

Figure 11A:
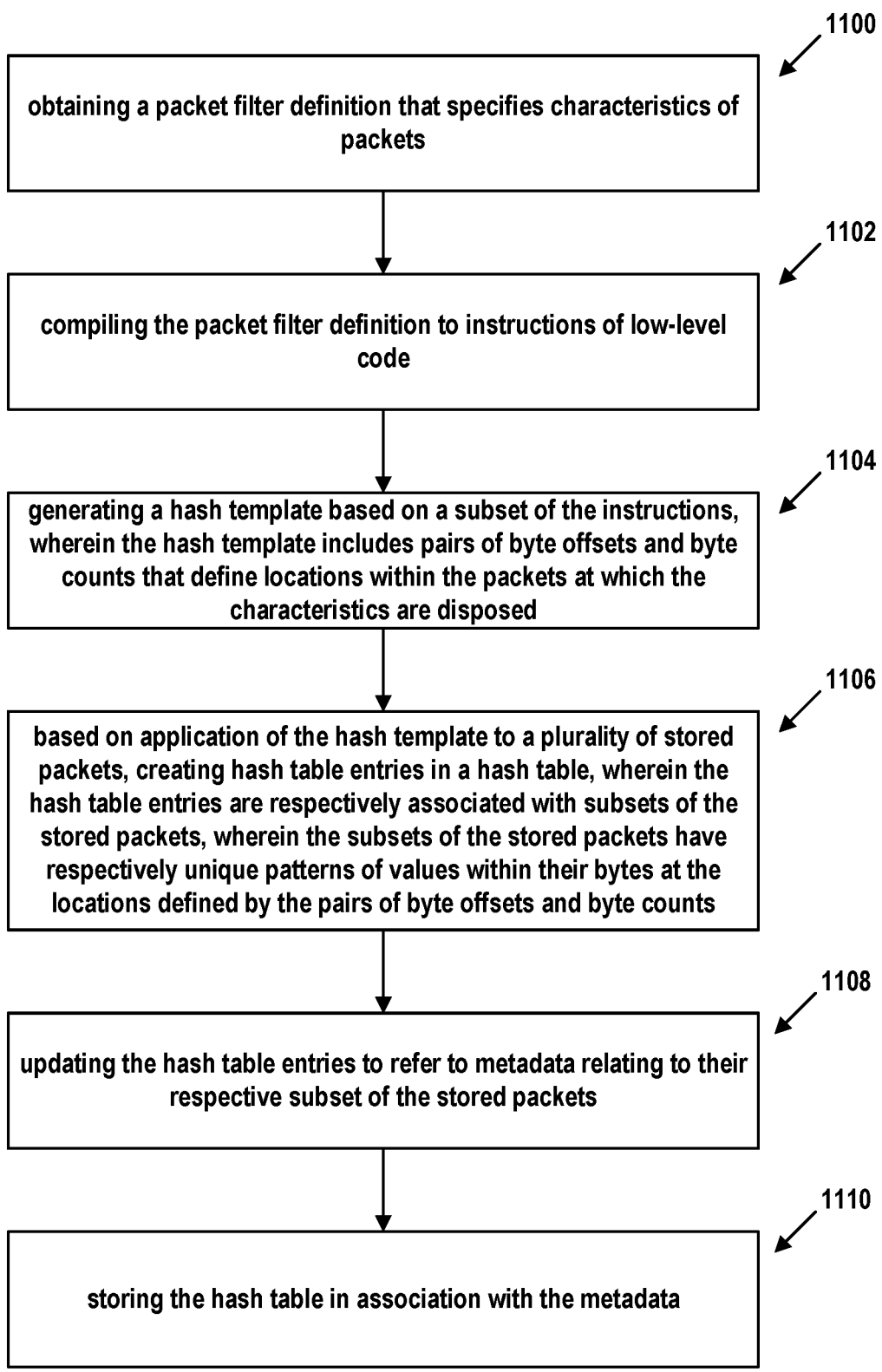
FIG. 11A is a flow chart, in accordance with example embodiments.
Figure 11B:
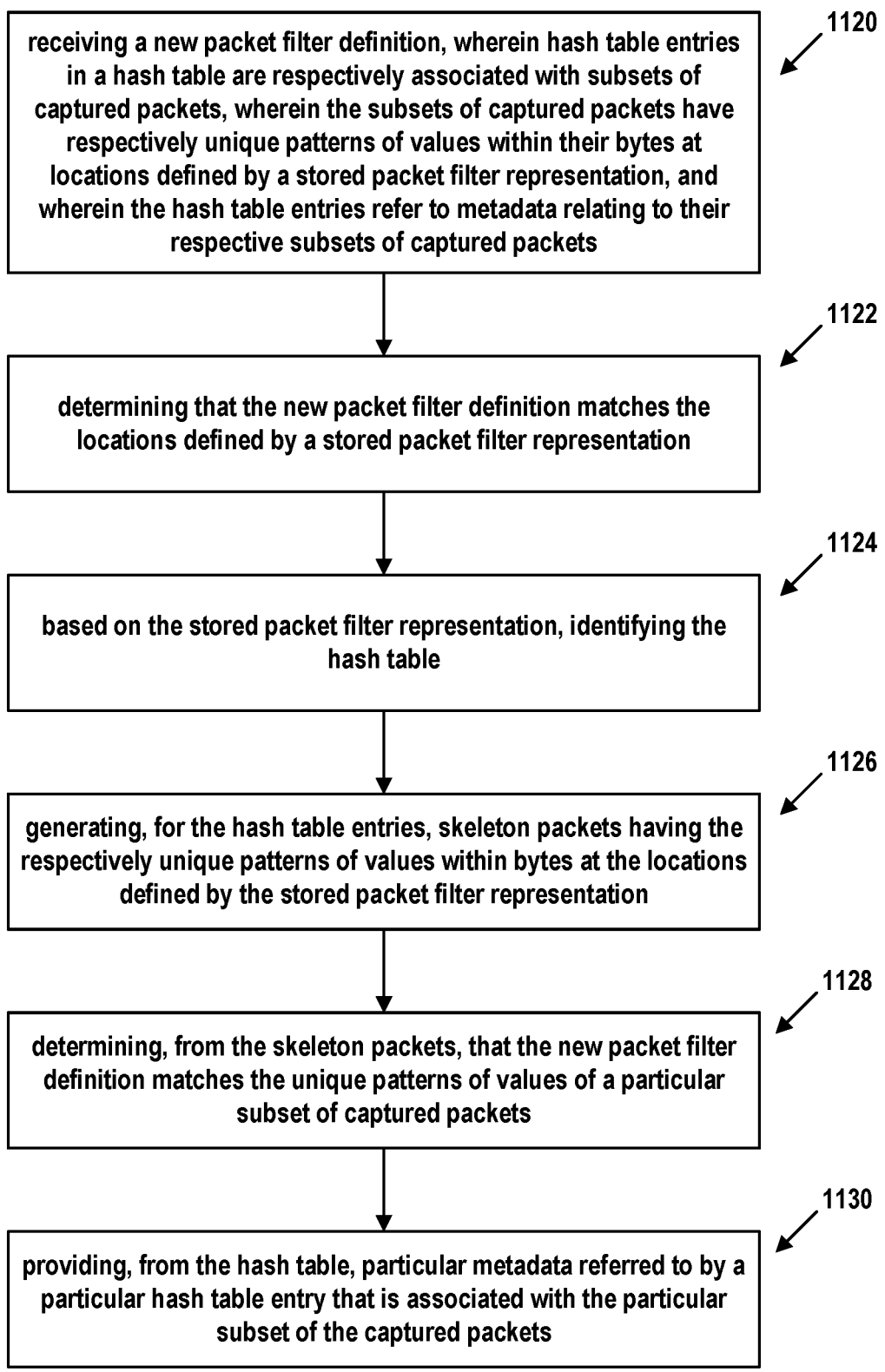
FIG. 11B is another flow chart, in accordance with example embodiments.

FIGS. 11A and 11B are flow charts illustrating example embodiments. The processes illustrated by FIGS. 11A and 11B may be carried out by a computing device or a packet capture device, for example. However, the processes can be carried out by other types of devices or device subsystems.

The embodiments of FIGS. 11A and 11B may be simplified by the removal of any one or more of the features shown therein. Further, these embodiments may be combined with one another, as well as features, aspects, and/or implementations of any of the previous figures or otherwise described herein.

Block 1100 may involve obtaining a packet filter definition that specifies characteristics of packets.

Block 1102 may involve compiling the packet filter definition to instructions of low-level code.

Block 1104 may generating a hash template based on a subset of the instructions, wherein the hash template includes pairs of byte offsets and byte counts that define locations within the packets at which the characteristics are disposed.

Block 1106 may involve, based on application of the hash template to a plurality of stored packets, creating hash table entries in a hash table, wherein the hash table entries are respectively associated with subsets of the stored packets, wherein the subsets of the stored packets have respectively unique patterns of values within their bytes at the locations defined by the pairs of byte offsets and byte counts.

Block 1108 may involve updating the hash table entries to refer to metadata relating to their respective subset of the stored packets.

Block 1110 may involve storing the hash table in association with the metadata.

In some embodiments, the packet filter definition is a textual representation of one or more values that can be present in packet headers or payloads.

In some embodiments, the instructions of low-level code are assembly-language instructions executable by a virtual machine. In some embodiments, the subset of the instructions are load instructions that read from specific byte offsets within packet headers or payloads. In some embodiments, generating the hash template comprises: parsing the instructions to identify the load instructions; and generating one of the pairs of byte offsets and byte counts from each of the load instructions.

In some embodiments, the metadata referred to by the hash table entries include packet counts or byte counts for the associated subsets of stored packets.

In some embodiments, the metadata referred to by the hash table entries includes storage addresses and/or per-packet timestamps for the associated subsets of stored packets. In some embodiments, the storage addresses are multi-dimensional.

Some embodiments may further involve storing at least part of the hash template, in association with the hash table, as a representation of the packet filter definition.

In some embodiments, the packet filter definition is stored as a packet filter representation in association with the hash table. These embodiments may further involve: receiving a new packet filter definition; determining, from the packet filter representation, that the new packet filter definition matches the locations defined by the pairs of byte offsets and byte counts; based on the packet filter representation, identifying the hash table; generating, for the hash table entries, skeleton packets having the respectively unique patterns of values within bytes at the locations defined by the packet filter representation; determining, from the skeleton packets, that the new packet filter definition matches the unique patterns of values of a particular subset of captured packets; and providing, from the hash table, particular metadata referred to by a particular hash table entry that is associated with the particular subset of the captured packets.

Turning to FIG. 11B, block 1120 may involve receiving a new packet filter definition, wherein hash table entries in a hash table are respectively associated with subsets of captured packets, wherein the subsets of captured packets have respectively unique patterns of values within their bytes at locations defined by a stored packet filter representation, and wherein the hash table entries refer to metadata relating to their respective subsets of captured packets.

Block 1122 may involve determining that the new packet filter definition matches the locations defined by the stored packet filter representation.

Block 1124 may involve, based on the stored packet filter representation, identifying the hash table.

Block 1126 may involve generating, for the hash table entries, skeleton packets having the respectively unique patterns of values within bytes at the locations defined by the stored packet filter representation.

Block 1128 may involve determining, from the skeleton packets, that the new packet filter definition matches the unique patterns of values of a particular subset of captured packets.

Block 1130 may involve providing, from the hash table, particular metadata referred to by a particular hash table entry that is associated with the particular subset of the captured packet.

In some embodiments, the new packet filter definition is a textual representation of one or more values that can be present in headers or payloads of the captured packets.

In some embodiments, determining that the new packet filter definition matches the locations defined by the stored packet filter representation comprises: compiling the new packet filter definition to instructions of low-level code; parsing the instructions of low-level code to identify load instructions; generating pairs of byte offsets and byte counts from each of the load instructions; and determining that the pairs of byte offsets and byte counts matches the stored packet filter representation.

In some embodiments, generating the skeleton packets comprises, for each respective hash table entry of the hash table entries: generating a byte array populated with default values; and writing, to the byte array, the respectively unique patterns of values of the associated subset of captured packets at the locations defined by the stored packet filter representation.

In some embodiments, determining that the new packet filter definition matches the unique patterns of values of a particular subset of captured packets comprises: applying the new packet filter definition to the skeleton packets; and determining that a particular skeleton packet matches values at locations defined by the new packet filter definition.

In some embodiments, the metadata referred to by the hash table entries include packet counts or byte counts for the associated subsets of captured packets.

In some embodiments, the metadata referred to by the hash table entries includes storage addresses and/or or per-packet timestamps for the associated subsets of captured packets. These embodiments may further involve retrieving, from the storage addresses, the associated subsets of captured packets and/or retrieving the per-packet timestamps thereof.

In some embodiments, the storage addresses are multi-dimensional.

In some embodiments, the new packet filter definition specifies one or more locations within packets, wherein determining that the new packet filter definition matches the locations defined by the stored packet filter representation comprises determining that the one or more locations specified by the new packet filter definition are a subset of the locations defined by the stored packet filter representation.

IX. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
    obtaining a packet filter definition that specifies characteristics of packets;
    compiling the packet filter definition to instructions of low-level code;
    generating a hash template based on a subset of the instructions, wherein the hash template includes pairs of byte offsets and byte counts that define locations within the packets at which the characteristics are disposed;
    based on application of the hash template to a plurality of stored packets, creating hash table entries in a hash table, wherein the hash table entries are respectively associated with subsets of the stored packets, wherein the subsets of the stored packets have respectively unique patterns of values within their bytes at the locations defined by the pairs of byte offsets and byte counts;
    updating the hash table entries to refer to metadata relating to their respective subset of the stored packets;
    storing the hash table in association with the metadata;
    receiving a new packet filter definition; and
    in response to receiving the new packet filter definition, retrieving, from the hash table, particular metadata referred to by a particular hash table entry that is associated with a particular subset of stored packets, wherein the new packet filter definition matches: the locations defined by the pairs of byte offsets and byte counts, and the unique patterns of values of the particular subset of stored packets.

2. The computer-implemented method of claim 1, wherein the packet filter definition is a textual representation of one or more values that can be present in packet headers or payloads.

3. The computer-implemented method of claim 1, wherein the instructions of low-level code are assembly-language instructions executable by a virtual machine.

4. The computer-implemented method of claim 3, wherein the subset of the instructions are load instructions that read from specific byte offsets within packet headers or payloads.

5. The computer-implemented method of claim 4, wherein generating the hash template comprises:
    parsing the instructions to identify the load instructions; and
    generating one of the pairs of byte offsets and byte counts from each of the load instructions.

6. The computer-implemented method of claim 1, wherein the metadata referred to by the hash table entries include packet counts or byte counts for the associated subsets of stored packets.

7. The computer-implemented method of claim 1, wherein the metadata referred to by the hash table entries includes storage addresses or per-packet timestamps for the associated subsets of stored packets.

8. The computer-implemented method of claim 7, wherein the storage addresses are multi-dimensional.

9. The computer-implemented method of claim 1, further comprising:
    storing at least part of the hash template, in association with the hash table, as a representation of the packet filter definition.

10. The computer-implemented method of claim 1, wherein the packet filter definition is stored as a packet filter representation in association with the hash table, the computer-implemented method further comprising:
    determining, from the packet filter representation, that the new packet filter definition matches the locations defined by the pairs of byte offsets and byte counts;
    based on the packet filter representation, identifying the hash table;
    generating, for the hash table entries, skeleton packets having the respectively unique patterns of values within bytes at the locations defined by the packet filter representation; and
    determining, from the skeleton packets, that the new packet filter definition matches the unique patterns of values of the particular subset of stored packets.

11. A non-transitory computer-readable medium storing program instructions that, when executed by one or more processors of a computing system, cause the computing system to perform operations comprising:
    obtaining a packet filter definition that specifies characteristics of packets;
    compiling the packet filter definition to instructions of low-level code;
    generating a hash template based on a subset of the instructions, wherein the hash template includes pairs of byte offsets and byte counts that define locations within the packets at which the characteristics are disposed;
    based on application of the hash template to a plurality of stored packets, creating hash table entries in a hash table, wherein the hash table entries are respectively associated with subsets of the stored packets, wherein the subsets of the stored packets have respectively unique patterns of values within their bytes at the locations defined by the pairs of byte offsets and byte counts;

updating the hash table entries to refer to metadata relating to their respective subset of the stored packets;

storing the hash table in association with the metadata;

receiving a new packet filter definition; and in response to receiving the new packet filter definition, retrieving, from the hash table, particular metadata referred to by a particular hash table entry that is associated with a particular subset of stored packets, wherein the new packet filter definition matches: the locations defined by the pairs of byte offsets and byte counts, and the unique patterns of values of the particular subset of stored packets.

12. The non-transitory computer-readable medium of claim 11, wherein the packet filter definition is a textual representation of one or more values that can be present in packet headers or payloads.

13. The non-transitory computer-readable medium of claim 11, wherein the instructions of low-level code are assembly-language instructions executable by a virtual machine.

14. The non-transitory computer-readable medium of claim 13, wherein the subset of the instructions are load instructions that read from specific byte offsets within packet headers or payloads.

15. The non-transitory computer-readable medium of claim 14, wherein generating the hash template comprises:
parsing the instructions to identify the load instructions; and
generating one of the pairs of byte offsets and byte counts from each of the load instructions.

16. The non-transitory computer-readable medium of claim 11, wherein the metadata referred to by the hash table entries include packet counts or byte counts for the associated subsets of stored packets.

17. The non-transitory computer-readable medium of claim 11, wherein the metadata referred to by the hash table entries includes storage addresses or per-packet timestamps for the associated subsets of stored packets.

18. The non-transitory computer-readable medium of claim 17, wherein the storage addresses are multi-dimensional.

19. The non-transitory computer-readable medium of claim 11, further comprising:
storing at least part of the hash template, in association with the hash table, as a representation of the packet filter definition.

20. The non-transitory computer-readable medium of claim 11, wherein the packet filter definition is stored as a packet filter representation in association with the hash table, the operations further comprising:
determining, from the packet filter representation, that the new packet filter definition matches the locations defined by the pairs of byte offsets and byte counts;
based on the packet filter representation, identifying the hash table;
generating, for the hash table entries, skeleton packets having the respectively unique patterns of values within bytes at the locations defined by the packet filter representation; and
determining, from the skeleton packets, that the new packet filter definition matches the unique patterns of values of the particular subset of stored packets.

* * * * *